(12) United States Patent
Zambetti

(10) Patent No.: US 10,998,811 B2
(45) Date of Patent: *May 4, 2021

(54) ELECTRONIC CONVERTER AND RELATED CONTROL METHOD, CONTROL CIRCUIT AND COMPUTER-PROGRAM

(71) Applicant: STMicroelectronics S.r.l., Agrate Brianza (IT)

(72) Inventor: Osvaldo Enrico Zambetti, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,011

(22) Filed: Apr. 17, 2020

(65) Prior Publication Data

US 2020/0244155 A1 Jul. 30, 2020

Related U.S. Application Data

(63) Continuation of application No. 16/047,719, filed on Jul. 27, 2018, now Pat. No. 10,658,918.

(30) Foreign Application Priority Data

Aug. 9, 2017 (IT) ................ 102017000092532

(51) Int. Cl.
*H02M 3/158* (2006.01)
*H02M 1/08* (2006.01)
*H02M 3/00* (2006.01)
*H02M 1/00* (2006.01)

(52) U.S. Cl.
CPC ........... *H02M 1/083* (2013.01); *H02M 3/005* (2013.01); *H02M 3/158* (2013.01);
(Continued)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 8,723,428 B2 * 5/2014 Yao ................. H05B 45/50
315/177
2004/0264214 A1 12/2004 Xu et al.
(Continued)

OTHER PUBLICATIONS

Huang, Daocheng et al., "Classification and Selection Methodogy for Multi-element Resonant Converters," IEEE Applied Power Electronics Conference and Exposition, Mar. 6, 2011, pp. 558-565.
(Continued)

*Primary Examiner* — Bryan R Perez
(74) *Attorney, Agent, or Firm* — Slater Matsil, LLP

(57) ABSTRACT

An electronic converter includes first and second inputs, first and second outputs, and a switching cell configured to supply current. The switching cell includes a half-bridge including first and second switches connected in series between the two inputs. The half-bridge includes a intermediate point between the first and second switch, a first inductor directly connected to the first output, a second inductor connected to the intermediate point, a first capacitor connected in series with the first and second inductors, a second capacitor connected between the intermediate point and the second input, and a circuit connected between a terminal of the first inductor and the second output. A circuit path of the converter is configured to couple the second inductor with the first output through the first capacitor and the first inductor, and another circuit path is configured to couple the second capacitor with the first output through the first inductor.

20 Claims, 11 Drawing Sheets

(52) U.S. Cl.
CPC .............. *H02M 2001/0051* (2013.01); *H02M 2001/0054* (2013.01); *H02M 2001/0058* (2013.01)

(58) Field of Classification Search
CPC .............. H02M 3/157; H02M 3/1563; H02M 2007/4818; H02M 2007/4815; H02M 2007/4811; Y02B 70/1425; Y02B 70/1491
USPC ........... 323/271, 273–285; 363/21.02, 21.03, 363/15–17, 97–98
See application file for complete search history.

(56) References Cited

U.S. PATENT DOCUMENTS

| | | |
|---|---|---|
| 2009/0033289 A1 | 2/2009 | Xing et al. |
| 2011/0181261 A1 | 7/2011 | Kalechshtein |
| 2012/0262967 A1 | 10/2012 | Cuk |
| 2013/0043854 A1 | 2/2013 | Tran et al. |
| 2013/0207626 A1 | 8/2013 | Chiba |
| 2014/0177300 A1 | 6/2014 | Lagorce et al. |
| 2016/0072387 A1 | 3/2016 | Schmalnauer et al. |
| 2016/0219660 A1* | 7/2016 | Kelly .................... H02M 3/158 |
| 2017/0012452 A1 | 1/2017 | Kang et al. |

OTHER PUBLICATIONS

Swartz, C. R., "High Performance ZVS Buck Regulator Removes Barriers to Increased Power Throughput in Wide Input Range Point-Of-Load Applications", White Paper, Vicor PowerBench, Aug. 2012, 10 pages.

* cited by examiner

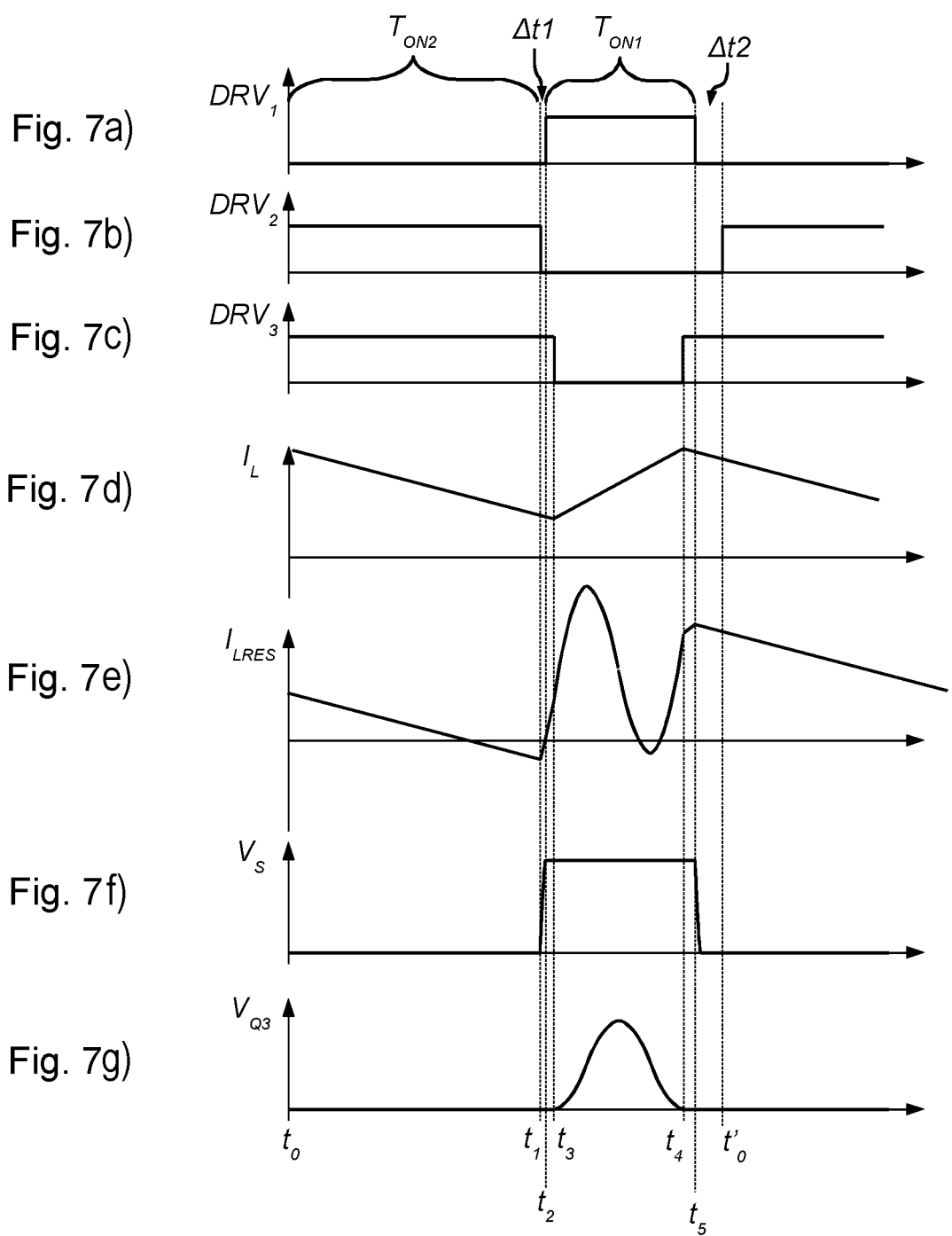

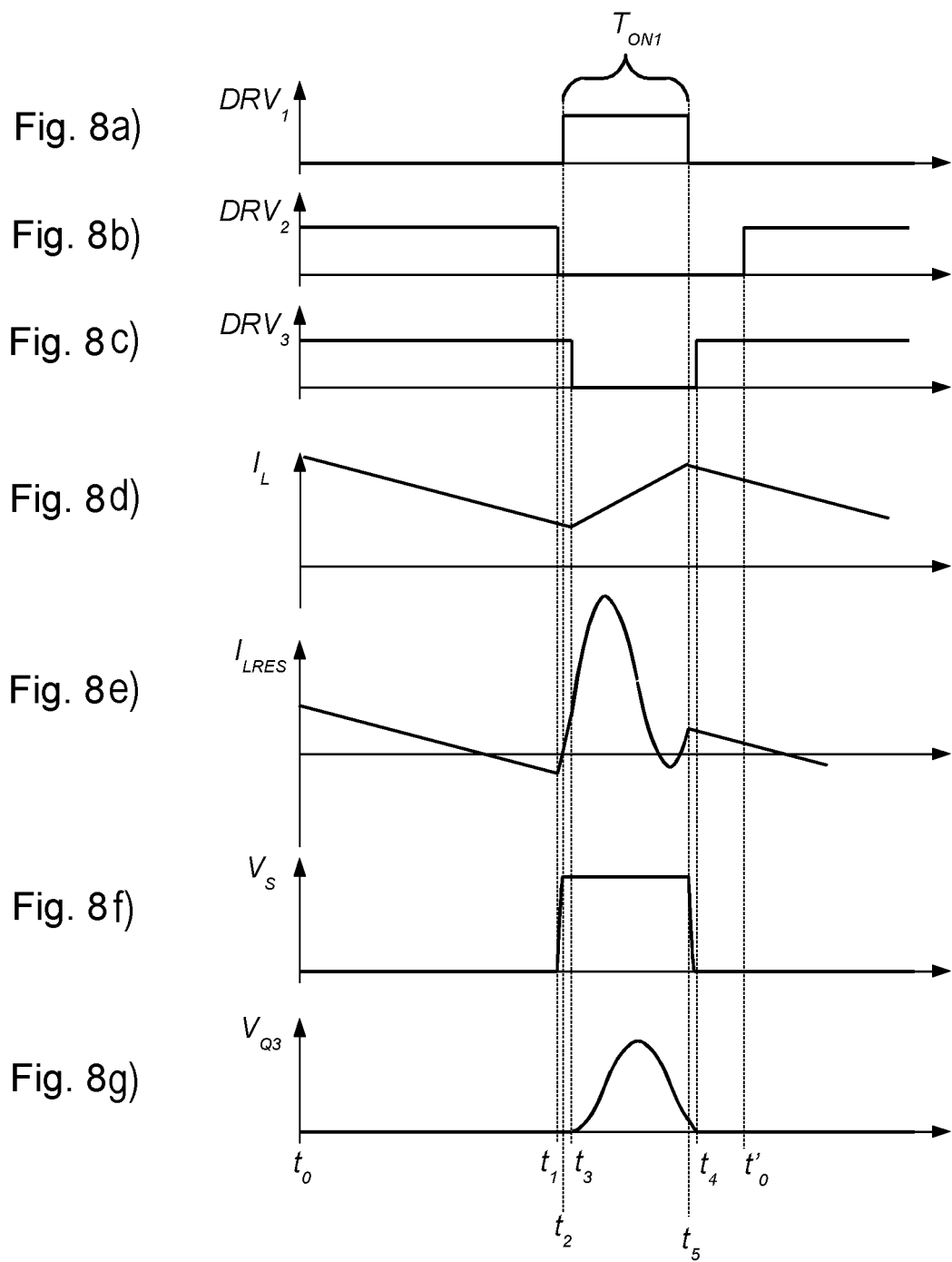

ELECTRONIC CONVERTER AND RELATED CONTROL METHOD, CONTROL CIRCUIT AND COMPUTER-PROGRAM

CROSS-REFERENCE TO RELATED APPLICATIONS

This application is a continuation application of U.S. application Ser. No. 16/047,719, filed on Jul. 27, 2018, which claims priority to Italian Patent Application No. 102017000092532, filed on Aug. 9, 2017, which applications are hereby incorporated herein their reference.

TECHNICAL FIELD

The embodiments of the present description relate generally to electronic converters, and in particular embodiments to a related control method, control circuit, and computer-program for controlling electronic converters.

BACKGROUND

Voltage converters of a non-insulated step-down type are widely used, for example, in the power-management field. The ease of use, simplicity, and excellent versatility in the various conditions of input and output voltage render the topology of a buck type one of the most widely used for this type of conversion.

FIG. 1 shows the circuit diagram of a typical buck converter 1.

In particular, a buck converter 1 includes two input terminals 10a and 10b for receiving a voltage Vin and two output terminals 12a and 12b for supplying a voltage Vout, where the output voltage is equal to or lower than the input voltage Vin.

In particular, typically, the buck converter 1 includes an electronic switch Q1 and an inductor L, which are connected (for example, directly) in series between the positive input terminal 10a and the positive output terminal 12a. Instead, the negative output terminal 12b is connected (for example, directly) to the negative input terminal, which typically represents a ground GND. Finally, a second electronic switch Q2 is connected (for example, directly) between the negative terminal 10b (or else, the negative terminal 12b) and the intermediate point between the electronic switch Q1 and the inductor L. The (high-side) switch Q1 and the (low-side) switch Q2 hence represent a half-bridge connected (for example, directly) between the terminals 10a and 10b, where the inductor L is connected (for example, directly) between the intermediate point of the half-bridge and the output terminal 12a.

Frequently, the switches Q1 and/or Q2 are transistors, for example field-effect transistors (FETs), for instance, n-channel MOSFETs. In this case, each switch Q1/Q2 hence has associated, i.e., connected in parallel, a diode D1/D2, which typically represents the body diode of the transistor, and a capacitance C1/C2, which typically represents the parasitic output capacitance of the transistor. Frequently, the second electronic switch Q2 is also implemented just with the diode D2, where the anode is connected to the terminal 12b and the cathode is connected to the switch Q1.

In the example considered, to stabilize the output voltage Vout, the converter 1 typically includes a capacitor C connected (for example, directly) between the output terminals 12a and 12b.

In this context, FIGS. 2a to 2f shows some waveforms of the signals of such an electronic converter, where:

FIG. 2a shows the signal DRV1 for switching the electronic switch Q1;

FIG. 2b shows the signal DRV2 for switching the second electronic switch Q2;

FIG. 2c shows the current IQ1 that traverses the electronic switch Q1;

FIG. 2d shows the voltage VS at the intermediate point between the electronic switch Q1 and the inductor L (i.e., the voltage at the second switch Q2);

FIG. 2e shows the current IL that traverses the inductor L; and

FIG. 2f shows the electrical losses PQ1 at the switch Q1.

In particular, when the electronic switch Q1 is closed at an instant t1 (ON state), the current IL in the inductor L grows linearly. The electronic switch Q2 is at the same time opened (with the diode D2 reverse biased). Instead, when the electronic switch Q1 is opened after an interval TON1 at an instant t2 (OFF state), the electronic switch Q2 is closed (with the diode D2 forward biased), and the current IL drops linearly. Finally, the switch Q1 is closed again after an interval TOFF1. In the example considered, the switch Q2 (or a similar diode) is hence closed when the switch Q1 is open, and vice versa.

The current IL can thus be used for charging the capacitor C, which supplies the voltage Vout at the terminals 12a and 12b.

In general, the electronic converter 1 hence includes a control circuit 14 that drives switching of the switch Q1, and possibly of the switch Q2, for repeating the intervals TON1 and TOFF1 periodically.

An extremely large number of driving schemes are known for the switch Q1, and possibly for the switch Q2. These solutions have in common the possibility of regulating the output voltage Vout by regulating the duration of the interval TON1 and/or the interval TOFF1.

For instance, in many applications, the control circuit 14 generates a driving signal DRV1 for the switch Q1 (and possibly a driving signal DRV2 for the switch Q2), where the driving signal DRV1 is a PWM (Pulse-Width Modulation) signal; i.e., the duration of the switching interval TSW1=TON1+TOFF1 is constant, but the working cycle TON1/TSW1 may be variable. In this case, the control circuit 14 typically implements a PI (Proportional-Integral) or PID (Proportional-Integral-Derivative) regulator configured for varying the working cycle of the signal DRV1 in such a way as to obtain a required output voltage Vout. In this case, the various operating modes of the converter (Continuous-Conduction Mode, CCM; Discontinuous-Conduction Mode, DCM; Transition Mode, TM) are well known in the technical field.

Consequently, in the operation described previously, the switch Q1 and the switch Q2 are driven with inverted signals.

However, this presents the drawback that the switch Q1 is closed at the instant t1 when the voltage VS at the intermediate point is zero, i.e., the voltage at the switch Q1 corresponds to the input voltage Vin, thus causing electrical losses.

Furthermore, as illustrated in FIG. 2c, a nonzero current may be imposed on the switch Q1 at the instant t1 due to the flow of current that traverses the inductor IL, when the converter operates in CCM. In fact, also by opening the switch Q2, the diode D2 remains forward biased. To prevent this problem, the electronic converter 1 can hence be driven in DCM or TM, where switching of the switch Q1 occurs at the instant t1 when the current IL is zero.

However, also in this case, a current peak may present at the instant t1, since there may be required a given recovery time until the diode D2 is completely opened. However, in the meantime, the diode D2 represents a short-circuit, and the closed switch Q1 is connected directly to the input voltage Vin. These losses hence also depend upon the input voltage Vin.

Finally, the inductor L and the parasitic capacitance C1/C2 can cause additional oscillations that generate further losses.

Since these losses present at each switching of the switch Q1, the losses also increase as the frequency of switching of the switches increases.

However, power distribution is continuously evolving from various points of view, such as power density, efficiency, and cost of the solution. For instance, to meet the increasingly stringent requirements of power density it is necessary to reduce the size of the magnetic components, and to do this it is necessary to increase the operating frequency of the system. However, as explained previously, as the operating frequency increases, also the switching losses increase linearly. To satisfy these increasingly stringent requirements of high efficiency, there have hence been developed switching elements that present an increasingly high performance in terms of switching speed and figure of merit (resistance RDSon of the switch Q1 in the closed condition multiplied by the charge Qg required as long as the switch Q1 is closed).

The availability of MOSFETs with higher switching speed hence makes it possible to increase the switching frequency to reduce the magnetic components (inductances) and thus increase the power density of the conversion systems. However, the use of faster transistors requires the development of more costly technologies with a major impact on the cost of the final converter solution.

Another way to reduce or even eliminate altogether the switching losses is to get the MOSFETs to function in ZVS (Zero-Voltage Switching) conditions. For instance, with reference to a buck converter, there the document U.S. Pat. No. 8,115,460 may be cited, the contents of which are incorporated herein by way of reference.

For instance, FIG. 3 shows the circuit diagram of such a converter of a buck type commonly referred to as "ZVS buck converter". In particular, the ZVS buck converter is constituted by the classic half-bridge Q1/Q2 of a buck converter, the inductance L, and in addition a switch QC connected in parallel to the inductor L.

FIGS. 4a to 4f once again show the signals DRV1/DRV2, the current IQ1, the voltage VS, the current IL, and the electrical losses at the switch Q1, and FIG. 4g shows the additional driving signal DRVQC for the switch QC.

In particular, to get the converter to function in ZVS mode it is necessary to drive it as if it were working in DCM. Furthermore, the voltage VS at the switch Q2 should reach the input voltage Vin; i.e., the capacitance C2 associated to the switch Q2 should be charged prior to the instant t1. In particular, to charge the aforesaid output capacitance C2 of the MOSFET bridge, a negative current IL is required from the output to the intermediate point of the half-bridge.

For instance, typically, a current sensor monitors the current that traverses the switch Q2 (or alternatively the inductor L) and provides the indication that the current IL has reached a given threshold value at an instant t3. Consequently, at the instant t3, the switch Q2 is opened, and the switch QC is closed. In this way, the current in the inductance L remains substantially constant at the predefined value and is ready to charge the intermediate node of the half-bridge for the next high-side switching-on.

In particular, at the instant t4, the switch QC is opened, and the negative current supplied by the inductor L is now used for charging the capacitance C2. Consequently, by choosing the correct threshold value for the instant t3, switching of the switch Q1 at the instant t1 can occur at zero current and zero voltage.

Even though this solution uses just one inductor L, two power MOSFETs Q1 and Q2, and one parallel MOSFET QC of small dimensions, it presents various disadvantages.

For instance, one of the most evident disadvantages is that, since it practically operates in DCM, the current ripple in the inductance L is practically twice the load current. This disadvantage leads to using this converter for currents that are not very high and to using different output filter capacitances C for filtering the high current ripple at high load that flows in the inductor L.

Another disadvantage of the topology is that the switching frequency markedly depends upon the output current Iout supplied through the terminals 12a and 12b, and more precisely is inversely proportional to the current required. This behaviour may prove problematical for proper compensation of the system.

A further disadvantage is that the system cannot absorb current from the load (the so-called sink mode) if not for very limited values.

SUMMARY

In view of the foregoing, an object of various embodiments of the present disclosure is to provide solutions capable of driving the switches in ZVS conditions even with different load conditions.

According to one or more embodiments, one or more of the above objects are achieved by an electronic converter. The embodiments moreover concern a corresponding control method, a control circuit, as well as a computer-program product, which can be loaded into the memory of at least one computer and includes parts of software code that are able to execute the steps of the method when the product is run on at least one computer. As used herein, reference to such a computer-program product is understood as being equivalent to reference to a computer-readable medium containing instructions for controlling the computer system in order to co-ordinate implementation of the method according to the invention. Reference to "at least one computer" is evidently understood as highlighting the possibility of the present invention being implemented in a modular and/or distributed form.

As mentioned previously, various embodiments of the present disclosure regard an electronic converter.

In various embodiments, the electronic converter includes a first (positive) input terminal and a second (negative) input terminal for receiving an input voltage. The electronic converter further includes a first (positive) output terminal and a second (negative) output terminal for supplying a (regulated) output voltage or current.

In various embodiments, the converter includes at least one switching cell configured for supplying a current. For instance, in various embodiments, this current can charge a capacitor connected between the first and second output terminals.

In particular, in various embodiments, the switching cell includes a half-bridge made up of a first electronic switch and a second electronic switch, which are connected (for example, directly) in series between the first and second input terminals, where a first capacitor is connected in parallel to the first electronic switch and a second capacitor is connected in parallel to the second electronic switch. In various embodiments, a first diode and a second diode are connected, respectively, in parallel to the first and second electronic switches. For instance, the first and second electronic switches may be field-effect transistors, such as MOSFETs, where the first and second capacitors include, respectively, the output capacitance of the first electronic switch and the output capacitance of the second electronic switch, and the first and second diodes corresponds, respectively, to the body diode of the first electronic switch and to the body diode of the second electronic switch.

In various embodiments, the switching cell further includes a first inductor, including a first terminal connected at the intermediate point between the first and second electronic switches, and a second terminal connected (for example, directly) to the first output terminal.

In various embodiments, a control circuit, such as a microprocessor programmed via software code, drives the first and second electronic switches as a function of the output voltage and/or output current.

In various embodiments, the switching cell further includes: a second inductor and a first capacitor, which are connected (for example, directly) in series between the first terminal of the first inductor and the intermediate point between the first and second electronic switches; switching circuit connected (for example, directly) between the first terminal of the first inductor and the second output terminal; and a third capacitance connected between the first terminal of the first inductor and the second input terminal or the second output terminal.

Consequently, in general, the second output terminal is not necessarily directly connected to the second input terminal, and the output can be referenced to a second ground. For this reason, the third capacitance may be connected to the second input terminal or to the second output terminal, which, however, could also be connected directly to the second input terminal in such a way as to operate with a common ground.

In various embodiments, the control circuit includes a driver circuit, for example in the form of a software module, configured for driving the switching circuit in such a way that:

when the driver circuit is deactivated, the driver circuit drives the switching circuit in such a way as to close the switching circuit (by connecting the first terminal of the first inductor to the second output terminal); and when the driver circuit is activated, the driver circuit drives switching circuit in such a way as to:
a) open the switching circuit when the current that traverses the switching circuit becomes positive (following upon activation),
b) once the switching circuit have been opened, close the switching circuit when the voltage across the switching circuit reaches zero; and
c) keep the switching circuit closed until a new activation of the driver circuit is detected.

Consequently, the driver circuit and the switching circuit implement a latched rectifier that allows passage of just one positive voltage pulse for each activation.

For instance, in various embodiments, the switching circuit includes a third electronic switch connected between the first terminal of the first inductor and the second input terminal or (alternatively) the second output terminal. Also in this case, a third diode may be connected in parallel to the third electronic switch. For instance, the third electronic switch may be a field-effect transistor, such as a MOSFET, where the third diode may correspond to the body diode of the third electronic switch.

In various embodiments, the control circuit can hence drive the first and second electronic switches with the following operating intervals, which are repeated periodically with a switching period:
a first interval, in which the first switch is closed and the second switch is open;
a subsequent, second, interval, in which the first switch is open and the second switch is open;
a subsequent, third, interval, in which the first switch is open and the second switch is closed; and
a subsequent, fourth, interval, in which the first switch is open and the second switch is open.

For instance, in various embodiments, the duration of the first interval is constant and longer than the resonance period of the resonant circuit made up of the first inductor, the second inductor, and the third capacitance, and the control circuit can vary the duration of the switching period to regulate the output voltage or current.

In various embodiments, the duration of the fourth interval is constant and corresponds to a quarter of the resonance period of the resonant circuit made up of the second inductor, the first capacitor, and the second capacitor, and the duration of the second interval is preferably constant.

In various embodiments, the control circuit can thus activate the driver circuit with a first delay with respect to the start of the first interval, and/or deactivate the driver circuit with a second delay with respect to the end of the first interval, thus enabling a single oscillation of the additional resonant circuit during the first interval.

In various embodiments, the electronic converter may also include a plurality of switching cells. In this case, the control circuit may also vary the duration of the first delay of at least one switching cell as a function of the current supplied by the first inductor of the switching cell with respect to the average current supplied by all the first inductors of the plurality of switching cells.

Consequently, in various embodiments, the control circuit performs the following operations:
a) closing the first switch (with the second switch open);
b) opening the first switch after a first interval;
c) closing the second switch after a second interval (with the first switch open);
d) opening the second switch after a third interval; and
e) returning to step a) after a fourth interval, thus repeating the sequence periodically.

In various embodiments, the control circuit opens the switching circuit between steps a) and b) when the current that traverses the switching circuit becomes positive (possibly introducing a delay as described previously). Furthermore, once the switching circuit have been opened, the control circuit closes the switching circuit when the voltage across the switching circuit reaches zero.

BRIEF DESCRIPTION OF THE DRAWINGS

The embodiments of the present disclosure will now be described with reference to the annexed drawings, which are provided purely by way of non-limiting example and in which:

FIGS. 6a to 6e, 7a to 7g, 8a to 8g, and 9 illustrate details of operation of the electronic converter of FIG. 5;

DETAILED DESCRIPTION OF ILLUSTRATIVE EMBODIMENTS

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in various points of this description do not necessarily refer to one and the same embodiment. Furthermore, particular conformations, structures, or characteristics may be combined in any adequate way in one or more embodiments.

The references used herein are only provided for convenience and hence do not define the sphere of protection or the scope of the embodiments.

In the ensuing FIGS. 5 to 18, parts, elements, or components that have already been described with reference to FIGS. 1 to 4 are designated by the same references used previously in these figures; the description of the aforesaid elements that have been presented previously will not be repeated in what follows in order not to burden the present detailed description.

Figure 1:
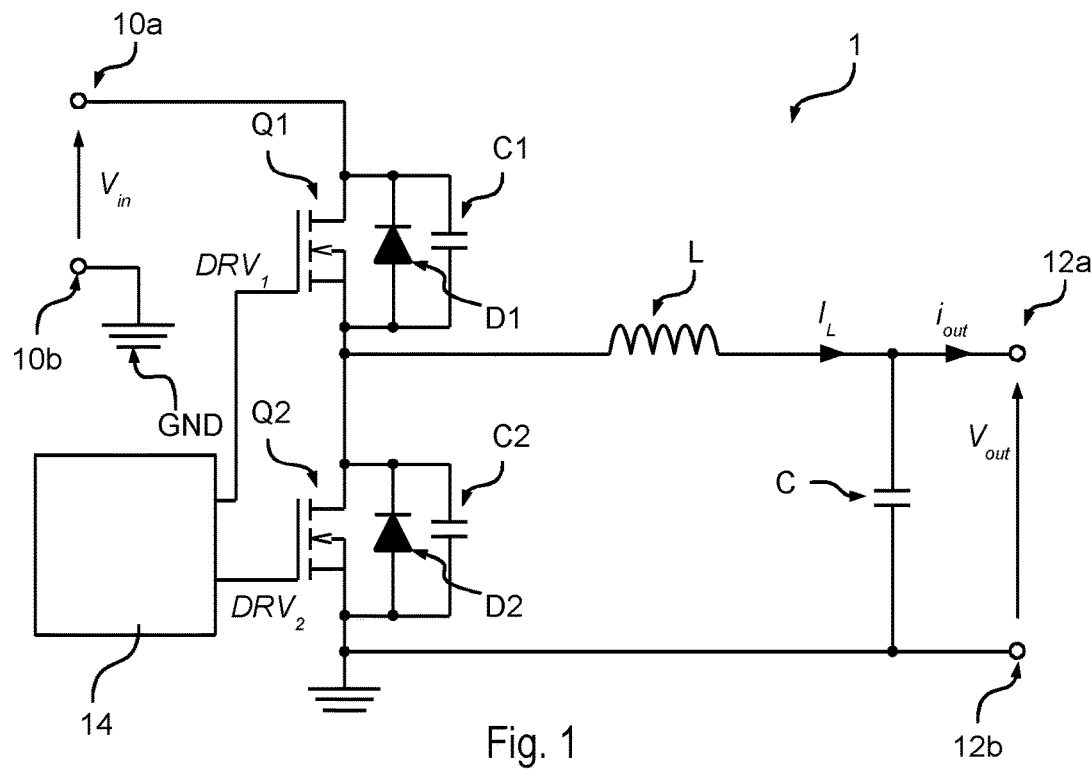
FIG. 1 shows the circuit diagram of a typical buck converter
Figure 2A:
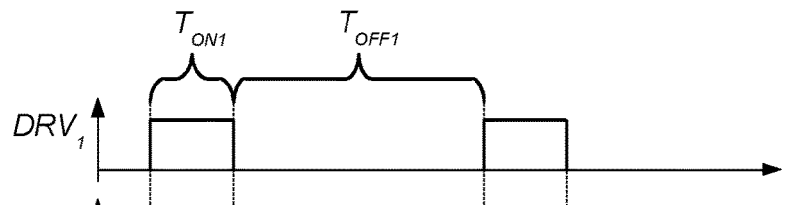
FIGS. 2a to 2f and FIGS. 4a to 4g show various waveforms of signals of an electronic converter.
Figure 2B:
Figure 2C:
Figure 2D:
Figure 2E:
Figure 2F:
Figure 3:
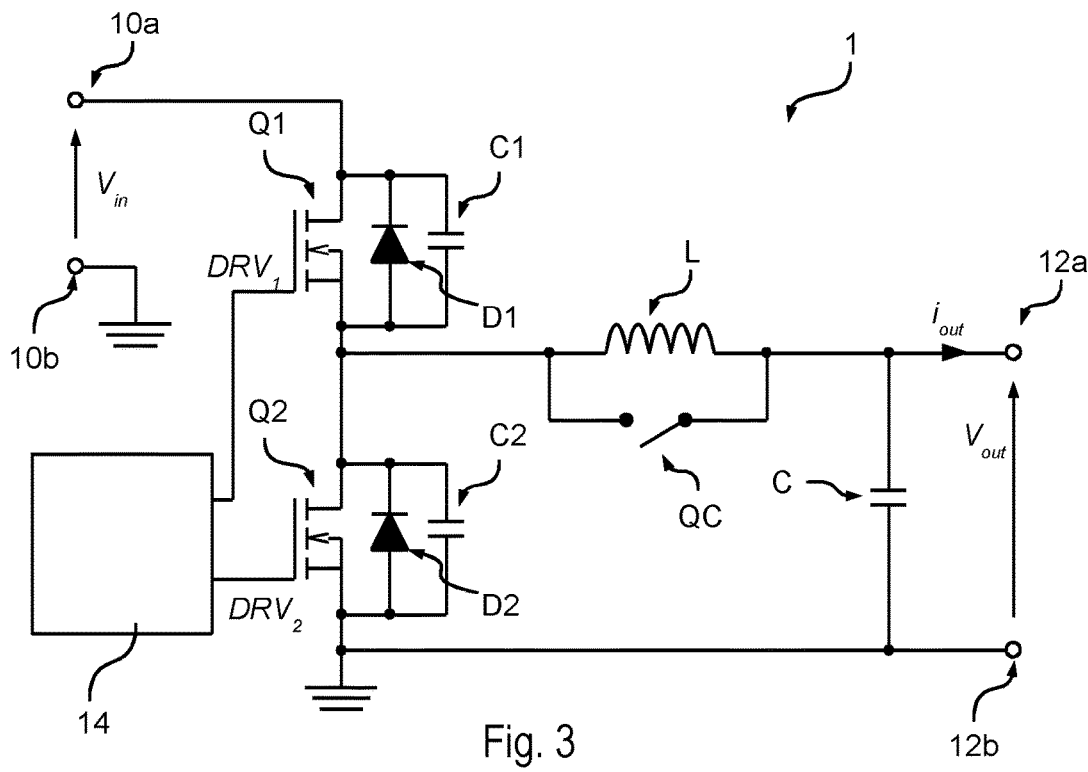
FIG. 3 shows a circuit diagram of a zero-voltage switching buck converter.
Figure 4A:
Figure 4B:
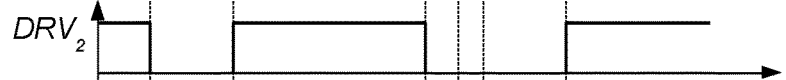
Figure 4C:
Figure 4D:
Figure 4E:
Figure 4F:
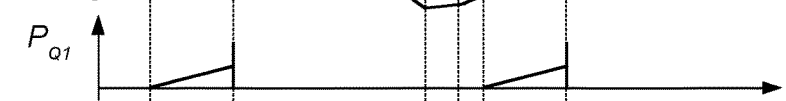
Figure 4G:
Figure 5:
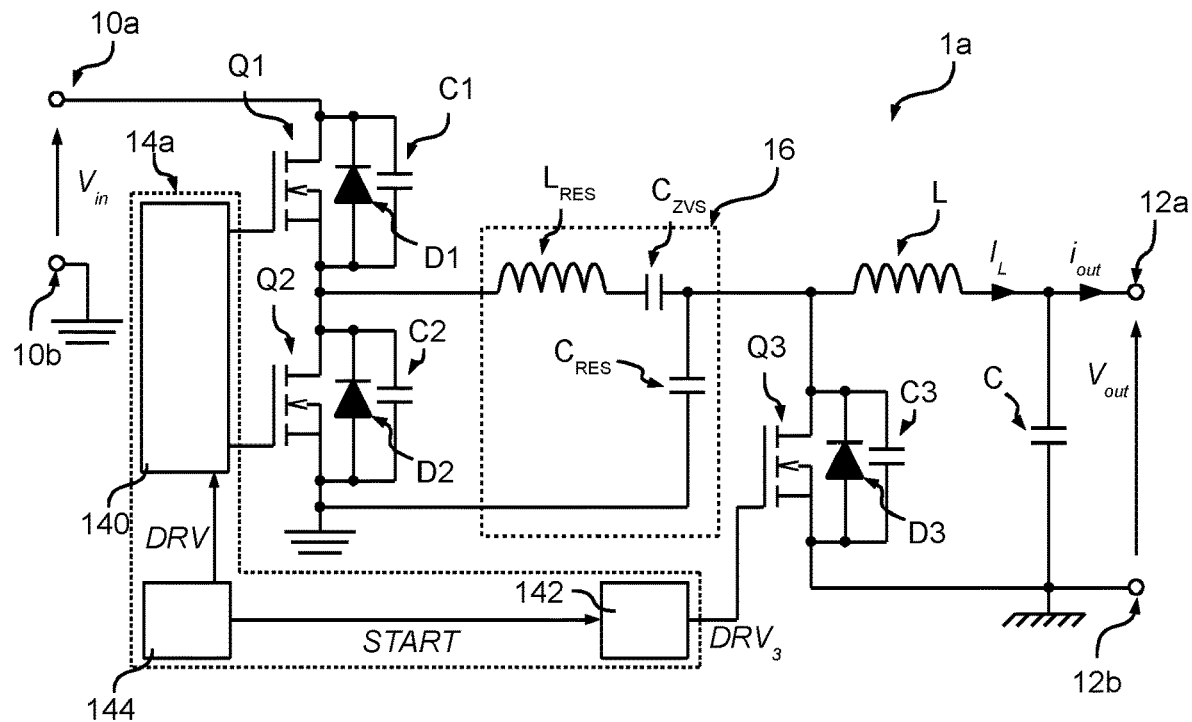
FIG. 5 shows a first embodiment of an electronic converter according to the present disclosure.
Figure 6A:
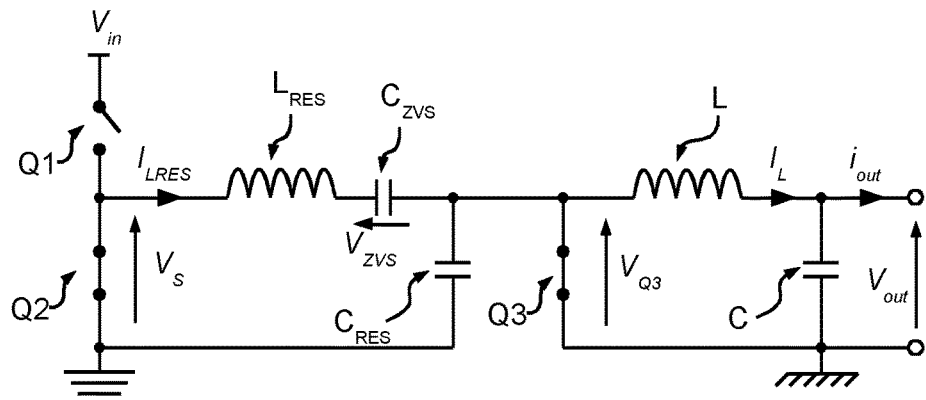
Figure 6B:
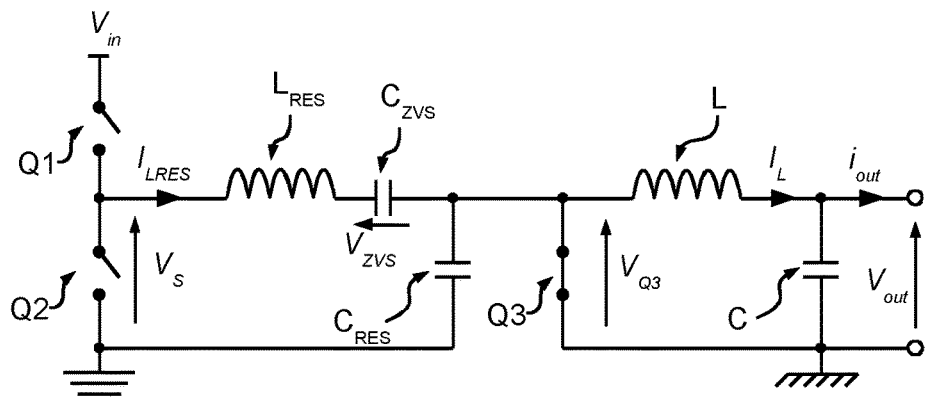
Figure 6C:
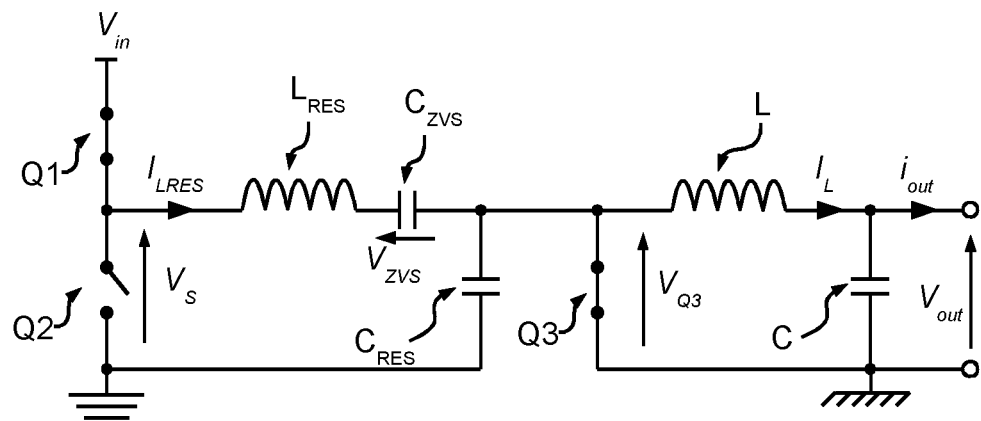
Figure 6D:
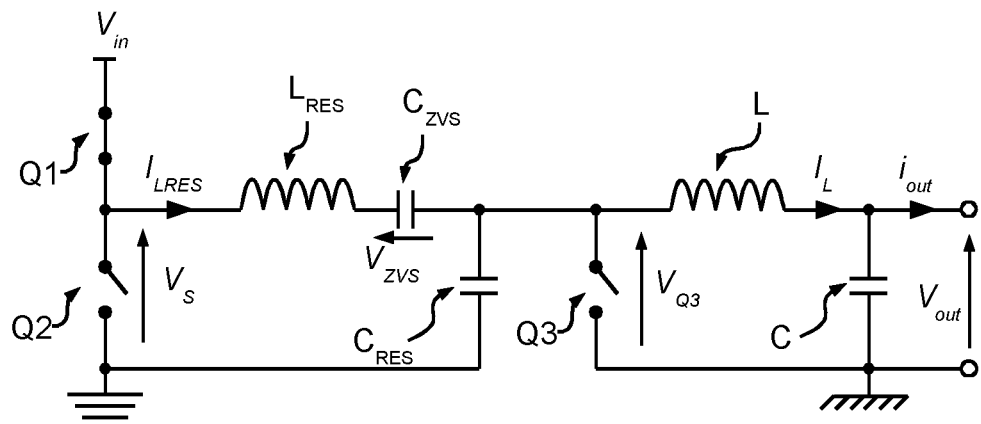
Figure 6E:
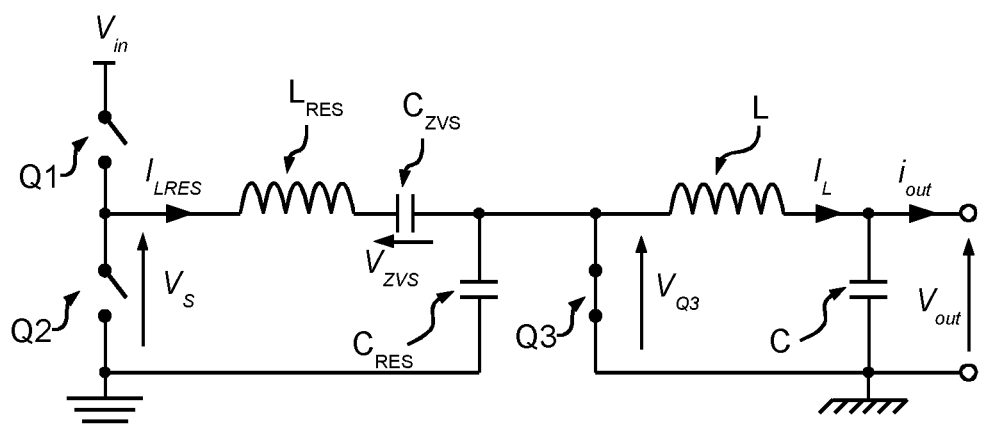

FIG. 5 shows an embodiment of an electronic converter 1a according to the present disclosure.

Also the electronic converter 1a includes a half-bridge including two electronic switches Q1 and Q2 connected (for example, directly) in series between the positive input terminal 10a and the negative input terminal 10b. In particular, in various embodiments, the electronic switches Q1 and Q2 are FETs, such as MOSFETs, e.g., n-channel MOSFETs. Consequently, in various embodiments, the drain terminal of the transistor Q1 is connected (for example, directly) to the terminal 10a, the source terminal of the transistor Q1 is connected (for example, directly) to the drain terminal of the transistor Q2, and the source terminal of the transistor Q2 is connected (for example, directly) to the terminal 10b. Instead, the gate terminal of the transistors Q1 and Q2 are driven via respective driving signals DRV1 and DRV2 that are generated via a control circuit 14a. Also in this case, each switch Q1/Q2 may have associated, i.e., connected in parallel, a respective diode D1/D2 and a respective parasitic capacitance C1/C2.

In the embodiment considered, as in a conventional buck converter, the converter 1a also includes an inductor L connected between the intermediate point of the half-bridge Q1/Q2 and the positive output terminal 12a, and a capacitor C connected (for example, directly) between the output terminals 12a and 12b.

In general, the terminal 12b may be connected (for example, directly) to the terminal 10b in such a way as to use a common ground. Instead, FIG. 6 shows the alternative solution, in which the terminal 12b represents a second ground.

However, in the embodiment considered, whereas a first terminal of the inductor L can be connected directly to the output terminal 12a, the second terminal of the inductor L is not directly connected to the intermediate point of the half-bridge Q1/Q2, but a resonant circuit 16 is connected between the intermediate point of the half-bridge Q1/Q2 and the second terminal of the inductor L.

In particular, in various embodiments, the resonant circuit 16 includes: a capacitor CRES connected (for example, directly) between the second terminal of the inductor L and the terminal 10b or alternatively the terminal 12b (which may in any case be connected to the terminal 10b when a common ground is used); and an inductor LRES connected (for example, directly) between the intermediate point of the half-bridge Q1/Q2 and the second terminal of the inductor L.

Consequently, in the embodiment considered, the electronic converter includes a resonant network represented by the capacitance CRES and by the inductors LRES and L.

In various embodiments, a capacitor $C_{ZVS}$ may be connected in series to the inductor $L_{RES}$, or else the inductor LRES and the capacitor $C_{ZVS}$ are connected (for example, directly) between the intermediate point of the half-bridge Q1/Q2 and the second terminal of the inductor L. The above capacitance $C_{ZVS}$ may be useful for guaranteeing a zero average current in the branch of the half-bridge and hence providing the condition necessary for a ZVS operation of both of the switches Q1 and Q2.

For instance, in various embodiments, the capacitance $C_{ZVS}$ is much higher than the resonance capacitance $C_{RES}$. Likewise, also the output capacitor C has a high value. For instance, in various embodiments, the capacitance of the capacitor $C_{ZVS}$ is between 100 nF and 500 µF, the capacitance of the capacitor C is between 10 µF and 10 mF and the capacitance of the capacitor $C_{RES}$ is between 10 nF and 1 µF. In various embodiments, the inductance of the inductor $L_{RES}$ is between 1 nH and 10 µH and the inductance of the inductor L is between 22 nH and 10 µH.

Consequently, it may be assumed that the voltage $V_{ZVS}$ across the capacitor $C_{ZVS}$ is practically constant during operation of the converter 1a. For the same reason, it is possible to approximate the resonance period $T_{RES}$ of the resonant network with:

$$T_{RES} = 2\pi \cdot \sqrt{\frac{L \cdot L_{LRES}}{L + L_{RES}} \cdot C_{RES}} \quad (1)$$

In various embodiments, the converter 1a also includes a switch Q3 connected (for example, directly) between the second terminal of the inductor L and the terminal 12b. For instance, also this switch Q3 may be an n-channel FET or MOSFET, with associated diode D2 and capacitance C3.

Consequently, when the switch Q3 is closed, the electronic converter 1a is divided into two parts that operate independently, in particular (assuming a common ground, but the principle also applies when the grounds 10b and 12b are separate):

a) the resonant components C1, C2, $L_{RES}$ (and $C_{ZVS}$) that are connected to the half-bridge Q1/Q2; and b) the resonant components L and C that are connected in parallel to the output 12a/12b.

In the embodiment considered, the control circuit 14a includes: a driver circuit 140 configured for generating the driving signals $DRV_1$ and $DRV_2$ for driving the switches Q1 and Q2, as a function of one or more driving signals DRV; a driver circuit 142 configured for generating a driving signal $DRV_3$ for driving the switch Q3 as a function of an activation signal START; and a control unit 144 configured for generating the signals DRV and START, such as a microprocessor programmed via software code.

In various embodiments, the driver circuit 140 is configured for driving the switch Q1 with a constant ON time $T_{ON1}$, whereas the OFF time $T_{OFF1}$ is variable in such a way as to obtain a required voltage $V_{out}$. Basically, with a constant ON time $T_{ON1}$, the energy transferred during each switching cycle will be practically constant, and by reducing the OFF time $T_{OFF}$, i.e., increasing the switching frequency, more energy can be transferred to the output.

In various embodiments, the driver circuit 142 drives the switch Q3 in such a way as to implement a triggered-rectifier circuit. In particular, once the signal START changes its logic value (e.g., it becomes high), the driver circuit 142 keeps the switch Q3 closed until the voltage $V_{Q3}$ at the switch Q3 becomes positive. When the voltage $V_{Q3}$ then again reaches zero, the driver circuit 142 closes the switch Q3, keeping the voltage $V_{Q3}$ at zero, and the driver circuit 142 keeps the switch Q closed until a new triggering is activated (e.g., with the next rising edge of the signal START).

Consequently, the converter 1a will include various operating areas. In particular, FIGS. 6a to 6e show the various steps of operation of the converter, on the basis of the state of switching of the switches Q1, Q2, and Q3 as driven by the control circuit 14a. Instead, FIGS. 7a to 7g show various waveforms, namely:

a) the driving signal $DRV_1$ for the switch Q1 (e.g., the voltage $V_{GS}$ between the gate terminal and the source terminal of the transistor Q1);

b) the driving signal $DRV_2$ for the switch Q2 (e.g., the voltage $V_{GS}$ between the gate terminal and the source terminal of the transistor Q2);

c) the driving signal $DRV_1$ for the switch Q3 (e.g., the voltage $V_{GS}$ between the gate terminal and the source terminal of the transistor Q3);

d) the current $I_L$ that traverses the inductor L;

e) the current $I_{LRES}$ that traverses the inductor $L_{RES}$;

f) the voltage $V_S$ at the intermediate point between Q1 and Q2 (e.g., the voltage $V_{DS}$ between the drain and source terminals of the transistor Q2); and g) the voltage $V_{Q3}$ at the switch Q3 (e.g., the voltage $V_{DS}$ between the drain and source terminals of the transistor Q3).

In particular (see also FIG. 6a), at an instant to the control circuit 14a closes the switch Q2, while the switch Q1 is open. Furthermore, the control circuit 14a keeps the switch Q3 closed.

Consequently, during this operating phase F1, the voltage $V_S$ and the voltage $V_{Q3}$ are zero (switches Q1 and Q3 closed). Consequently, the current $I_{LRES}$ in the inductance $L_{RES}$ drops substantially linearly as a function of the voltage $V_{ZVS}$ on the capacitor $C_{ZVS}$, i.e., with a slope equal to $V_{ZVS}/L_{RES}$ (i.e., $(V_{ZVS}-V_{10b})/L_{RES}$ if the voltage $V_{10b}$ of the terminal 10b is not 0 V, but is a common-mode voltage other than 0 V with respect to the voltage $V_{12b}$ to the node 12b, which is 0 V). Likewise, the current $I_L$ in the inductance L drops substantially linearly as a function of the output voltage $V_{out}$, i.e., with a slope equal to $V_{out}/L$.

In the embodiment considered, the control circuit 14a opens the switch Q2 at an instant $t_1$ (see FIG. 6b), while the switch Q3 remains closed. In particular, in the embodiment considered, the control circuit 14a opens the switch Q2 at the instant $t_1$ after a variable time $T_{ON2}$. As will be described hereinafter, the ON time $T_{ON2}$ of the switch Q2 should be sufficiently long in such a way that the current $I_{LRES}$ will be negative and will have an amplitude that is sufficient for charging the capacitances at the intermediate node of the half-bridge Q1/Q2 to the voltage $V_{in}$.

Consequently, during this operating phase F2, the negative current $I_{LRES}$ charges the output capacitances C1 and C2 of the switches Q1 and Q2 until the voltage $V_S$ reaches the voltage $V_{in}$ at an instant $t_2'$. In particular, in the embodiment illustrated in FIG. 6, it is assumed that the current $I_{LRES}$ reaches zero at an instant $t_2$ that coincides with the instant $t_2'$.

Consequently, in the embodiment considered, the control circuit 14a can close the switch Q1 at the instant $t_2'$ at zero voltage $V_{DS1}$ since the voltage $V_S$ is equal to $V_{in}$.

However, in general, the current $I_{LRES}$ is typically still negative at the instant $t_2'$. In this case, the negative current $I_{LRES}$ could hence charge the output capacitances $C_1$ and $C_2$ beyond the voltage $V_{in}$. However, in this case, once the voltage $V_{in}$ has been reached and as long as the current $I_{LRES}$ is negative, the diode D1 is closed and the voltage $V_S$ is kept at the voltage $V_{in}$ (neglecting the voltage drop across the diode D1). Consequently, in this case, the control circuit 14a can close the switch Q1 even after the instant $t_2'$ with zero voltage, in particular, as long as the current $I_{LRES}$ is negative or until it reaches zero at the instant $t_2$.

Furthermore, even though the negative current $I_{LRES}$ were insufficient for charging the output capacitance $C_1$ and $C_2$ completely, the increase in voltage $V_S$ in any case enables reduction of the electrical losses.

Consequently, instead of basing switching of the switch Q1 on the voltage $V_S$ at the intermediate node of the half-bridge, the control circuit 14a can close the switch Q1 when the current $I_{LRES}$ reaches zero at the instant $t_2$. In fact, when the current $I_{LRES}$ becomes positive, this current would discharge the capacitances $C_1$ and $C_2$ again. In particular, the current $I_{LRES}$ becomes zero after a time $\Delta t1$ ($t_2-t_1$) that substantially corresponds to a quarter of the oscillation period of the resonant circuit made up of $L_{RES}$, C1, and C2, i.e.:

$$\Delta t1 = \frac{\pi}{2} \cdot \sqrt{L_{LRES} \cdot (C1 + C2)} \qquad (2)$$

Consequently, the duration of the operating interval F2 may be constant; i.e., the control circuit 14a can close the switch Q1 after the constant time $\Delta t1$. Alternatively, the control circuit 14a can also monitor a signal that represents the current $I_{LRES}$ during the phase F2.

This embodiment hence presents the advantage that switching occurs at zero current and preferably also at zero voltage.

Consequently, in the embodiment considered, the control circuit 14a closes the switch Q1 at the instant $t_2$ (see FIG. 6c), while the switch Q3 remains closed and the switch Q2 remains open.

Consequently, during this operating phase F3, the switches Q1 and Q3 are closed, and the current $I_{LRES}$ in the inductance $L_{RES}$ grows substantially linearly (as a function of the difference in voltage between $V_{in}$ and $V_{ZVS}$) until, at an instant $t_3$, the current $I_{LRES}$ corresponds to the current $I_L$; i.e., the current that traverses the switch Q3 becomes zero. In particular, in the embodiment considered, the control circuit 14a opens the switch Q3 at the instant $t_3$. For instance, for this purpose, the control circuit 14a can monitor the current that traverses the switch Q3, for example a current sensor connected in series to the switch Q3.

Consequently, the instant $t_3$ corresponds to the triggering instant, in which the control circuit 14a opens the switch Q3. Hence, in the embodiment considered, the switch Q3 remains open as long as the voltage $V_{Q3}$ on the switch Q3 is positive, and the switch Q3 is closed when the voltage $V_{Q3}$ drops again to zero.

In particular, during the subsequent operating phase F4 (see FIG. 6d), the switch Q3 is opened and the current $I_{LRES}$ corresponds initially (at the instant $t_3$) to the current $I_L$. However, the current charges also the capacitor $C_{RES}$, thus creating a resonance in the voltage $V_{Q3}$; i.e., on account of this oscillation, the voltage $V_{Q3}$ can also reach again zero at an instant $t_4$.

In the embodiment considered, the operating phase F4 terminates when the control circuit 14a opens the switch Q1 at an instant $t_4$ after a constant ON interval $T_{ON1}$.

In general, the switch Q3 may thus be closed at the instant $t_4$ before or after the switch Q1 is opened at an instant $t_5$. In particular, FIG. 7 shows the case where $t_4<t_5$, and FIG. 8 shows the case where $t_4>t_5$.

In general, the switch Q1 should be open at the instant $t_5$ when the current $I_{LRES}$ is positive in such a way as to discharge the capacitances C1 and C2, this generating the ZVS condition for the switch Q2.

The choice of the duration $T_{ON1}$ will depend upon many factors. For instance, in general the amount of charge that it will be possible to transfer at output presents a limit determined by the components and by the system quantities. For instance, it is possible to estimate the time $T_{ENERGY}$ necessary for energizing the inductance as a function of the current output $I_{out}$, the current ripple $\Delta I_{RIPPLE}$ in the inductor L, the resonance inductance $L_{RES}$ used, and the voltage $V_{in}$, $$T_{ENERGY} = \frac{I_{out} - \frac{\Delta I_{RIPPLE}}{2}}{V_{in}} \cdot L_{RES} \quad (3)$$

In various embodiments, the ON time $T_{ON1}$ of the switch Q1 should hence be longer than the time $T_{ENERGY}$ necessary for energizing the inductance added to half of the resonance period, namely, $$T_{ON1} \geq T_{ENERGY} + \frac{T_{RES}}{2} \quad (4)$$

Furthermore, the ON time $T_{ON1}$ should also be chosen to guarantee the ZVS condition of the half-bridge Q1/Q2 and prevent power from being uselessly dissipated on recirculation diodes D1/D2 during transition in ZVS.

For instance, the inventors have noted that it is normally useful to choose an ON time $T_{ON1}$ longer than the resonance time $T_{RES}$; i.e., $$T_{ON1} > T_{RES} \quad (5)$$

Consequently, knowing the resonance time $T_{RES}$, the ON time $T_{ON1}$ can be pre-calculated.

As mentioned previously, the instant $t_4$ (closing of the switch Q3) may be before or after opening of the switch Q1 at the instant $t_5$.

In particular, in the case where the voltage $V_{Q3}$ reaches zero (and the switch Q3 is closed) sooner (see FIG. 6e and FIG. 7), the oscillation stops. In any case, the inductor $L_{RES}$ and the capacitor $C_{ZVS}$ are still connected to the voltage $V_{in}$, and the current $I_{LRES}$ continues to increase. Also the inductor L and the capacitor C are again independent, and the current $I_L$ drops linearly.

Instead, in the case where the switch Q1 is opened before (see FIG. 8), the current $I_{LRES}$ is lower than the current $I_L$, and the capacitor $C_{RES}$ is discharged until the voltage $V_{Q3}$ reaches zero at the instant $t_4$, thus closing the switch Q3.

In any case, by sizing the time $T_{ON1}$ in an appropriate way, the current $I_{LRES}$ is positive at the instant $t_5$. Consequently, the current discharges the capacitances C1/C2 of the switches Q1/Q2 until the voltage $V_S$ becomes zero. At this point, the diode D2 that keeps the voltage $V_S$ at zero can also intervene (neglecting, in this case, the voltage drop at the diode D2) until the current $I_{LRES}$ becomes negative. Consequently, the switch Q2 can be closed at zero voltage (instant $t_0'$ at which a new switching cycle starts) between the instant at which the voltage $V_S$ reaches zero and the instant at which the current $I_{LRES}$ becomes negative.

For instance, in various embodiments the time $\Delta t2$ (between $t_5$ and $t_6$) may be constant and pre-determined.

Consequently, in various embodiments, the time $T_{SW}$ of a switching cycle corresponds to the sum of: the constant time $T_{ON1}$ during which the switch Q1 is closed; the constant time $\Delta t2$ until the switch Q2 is closed; the variable time $T_{ON2}$ during which the switch Q2 is closed; and the constant time $\Delta t1$ until the switch Q1 is closed.

As described previously, in various embodiments, the ON time $T_{ON1}$ of the switch Q1 of the half-bridge Q1/Q2 is of fixed duration, whereas the ON time of the switch Q3 depends upon the voltage information $V_{Q3}$ and upon the activation signal START. In particular, the driver circuit 142 does not behave like a classic rectifier that opens the switch Q3 whenever the current becomes positive and switches it on whenever the voltage $V_{Q3}$ would become negative, but like a latched rectifier, which is activated only once in response to the activation signal START. In fact, the activation signal START corresponds not to closing or opening of the switch Q3, but rather to activation of the rectifier for opening the switch Q3 when the current becomes positive. Consequently, the current is not necessarily positive at the moment of activation. Once the switch Q3 is open, after a time equal approximately to the resonance time $T_{RES}$ (assuming $T_{ON1}>T_{RES}$) the voltage $V_{Q3}$ will reach the ZVS condition of the switch Q3, which at this point is closed. The switch Q3 at this point will remain closed until the next activation the signal START (e.g., until the next rising edge of the signal START) irrespective of whether its current is positive or negative.

In particular, in the case where $T_{ON1}>T_{RES}$, the transfer of energy in a switching cycle will not depend upon the duration $T_{ON1}$ but only upon the time $T_{RES}$, since the energy is supplied at output only during the interval between the instants $t_3$ and $t_4$, which substantially corresponds to $T_{RES}$. In particular, in the case where the time $T_{ON1}$ is long with respect to the time $T_{RES}$, the driver circuit 142 drives the switch Q3 in any case, in such a way as to allow passage only of the first oscillation of the resonant circuit, and possible subsequent oscillations are suppressed. Otherwise, a simple diode, instead of the switch Q3, would allow also passage of the aforesaid subsequent oscillations. Consequently, when $T_{ON1} > T_{RES}$, the time $T_{ON1}$ could also be variable, even though this does not increase the amount of energy transferred at output.

Hence, the signal START could activate the rectification implemented with the driver circuit 142 simultaneously with switching of the signal $DRV_1$ at the instant $t_2$, since the current that traverses the switch Q3 is still negative at this instant. As will be described hereinafter, in various embodiments, the signal START can be activated (rendered high or low) in any case with a delay (e.g., a programmable delay) with respect to each closing of the switch Q1 at the instant $t_2$.

In general, deactivation of the signal START can occur at any moment, for example simultaneously with switching of the signal $DRV_1$ at the instant $t_5$. Also in this case a delay may be introduced.

In general, the driver circuit 142 may be configured for setting at high impedance the rectification stage (i.e., for opening the switch Q3) in particular operating modes, for example during start of the converter 1a with precharged output or switching-off of the converter 1a, or as will be described hereinafter for implementing the phase of a multiphase system and operation in pulse-skipping mode to reduce the consumption levels at low output load.

In general, for this purpose, an additional signal or the signal START may be used. For instance, in various embodiments, when the signal START is driven at a voltage intermediate between the low logic level and the high logic level, the control circuit 142 can short the gate terminal and the source terminal of the switch Q3, in effect switching off the output stage of the converter.

Figure 9:
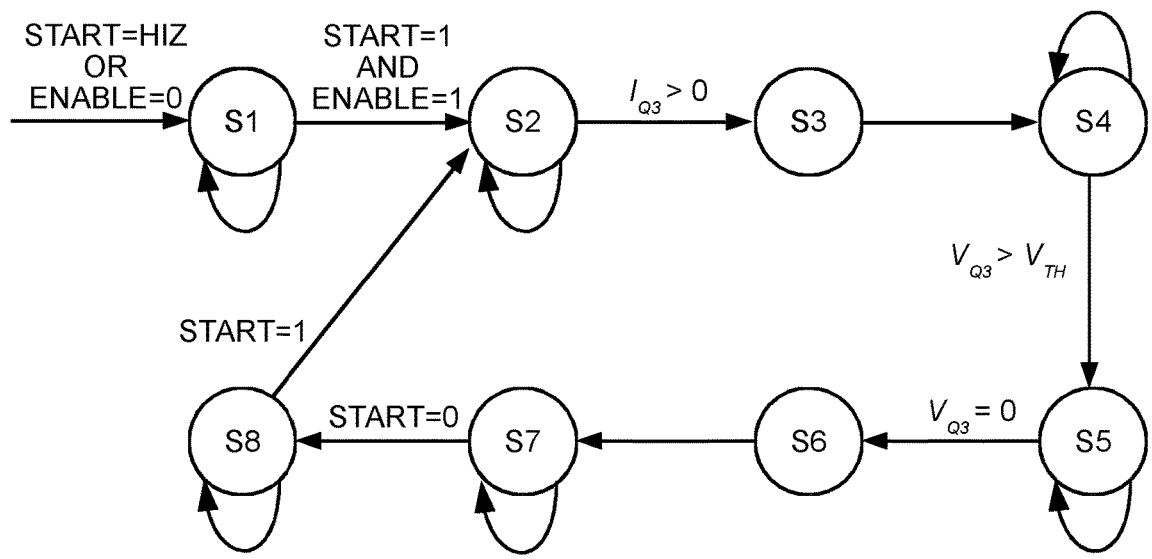

FIG. 9 shows a possible embodiment of the driver circuit 142 that activates rectification in response to the activation signal START, for example when the signal START switches from "0" (low) to "1" (high).

In the embodiment considered, the driver circuit 142 is implemented with a finite-state machine, which starts from a reset state S1. For instance, the state S1 can be activated when the signal START has the intermediate level or is set at high impedance "HIZ". In addition to or as an alternative, the state S1 may be activated when an enabling signal ENABLE is low (or likewise, when a reset signal is high).

In particular, in the state S1, the driver circuit 142 keeps the switch Q3 open, for example setting the gate terminal of the transistor Q3 to ground.

The driver circuit 142 remains in the state S1, until a rising edge of the activation signal START is detected (and the enabling signal ENABLE is high); i.e., the driver circuit 142 leaves the state S1 when the signal START is set at "1".

In particular, in this case, the driver circuit 142 moves on to a state S2, which basically represents a wait state until the current $I_{Q3}$ that traverses the switch Q3 becomes positive. Consequently, in the state S2, the driver circuit 142 closes the switch Q3.

Once it is detected that the current $I_{Q3}$ that traverses the switch Q3 has become positive, the driver circuit 142 opens the switch Q3.

For instance, for this purpose, the driver circuit 142 can use a signal ZCD supplied by a zero-crossing comparator for detecting zero-crossing of the current $I_{Q3}$ in the switch Q3. For instance, the signal ZCD="1" may indicate that the current coming from the inductor $L_{RES}$ is higher than the current in the output inductor; namely, the current $I_{Q3}$ in the switch Q3 becomes positive (i.e., it enters the drain terminal). Instead of using a current sensor, the zero-crossing comparator may also monitor the voltage $V_{Q3}$, since, owing to the resistance RDSon of the switch Q3, even a small voltage drop (positive or negative) will be present at the switch Q3.

Consequently, once the signal ZCD supplied by the comparator indicates that the current that traverses the switch Q3 (or the voltage $V_{Q3}$) has become positive, the driver circuit 142 moves on to a state S3, where the driver circuit 142 opens the switch Q3. In various embodiments, the driver circuit 142 may also activate a watchdog counter; i.e., the driver circuit 142 moves on to the state S3 even when the aforesaid watchdog expires.

The driver circuit 142 then directly goes to a state S4. In the state S4, the driver circuit 142 monitors the voltage $V_{Q3}$ when the switch Q3 is open. In particular, the driver circuit 142 remains in the state S4 until the voltage $V_{Q3}$ exceeds a given threshold $V_{TH}$, which thus indicates the fact that the voltage $V_{Q3}$ increases after the instant $t_3$; i.e., the driver circuit 142 moves on to a state S5 when the voltage $V_{Q3}$ exceeds the threshold $V_{TH}$.

In the state S5, the driver circuit 142 detects whether the voltage $V_{Q3}$ at the switch Q3 has again reached zero. For this purpose, the signal ZVD supplied by a zero-crossing comparator for detecting zero-crossing of the voltage at the switch Q1 may hence be used. As explained previously, this comparator may be physically represented by the ZCD comparator itself since the information is always the same.

Consequently, once the signal ZVD supplied by the comparator indicates that the voltage $V_{Q3}$ has become zero, the driver circuit 142 goes to a state S6, in which it closes the switch Q3. In various embodiments, the driver circuit 142 may also activate a watchdog counter; i.e., the driver circuit 142 moves on to the state S6 even when the aforesaid watchdog expires.

Consequently, from this moment on, the switch Q3 is again closed, and the driver circuit 142 could return to the step S2 when a new rising edge of the signal START is detected.

In particular, in the embodiment considered, a check is made to see whether the signal START has again become "0". For this purpose, the driver circuit 142 proceeds to a step S7, where it waits until the signal START is set at "0". In this case, the driver circuit 142 goes to a state S8, which basically represents a wait state until the signal START is again set at "1", and the procedure is repeated starting from the state S2.

In the embodiment considered, the signal START can hence be a signal delayed by a time $T_{START}$ with respect to the signal $DRV_1$ for the switch Q1. The time $T_{START}$ does not necessarily have to be greater than zero but may even be zero. In this case, the signal START will be identical to the signal $DRV_1$. In general, the operating logic of the rectifier 142/Q3 can function also with a signal START inverted.

Furthermore, in the embodiment considered, the signal ENABLE represents general enablement of the rectifier, which can be set at high impedance both by the signal ENABLE and by the signal START. In the embodiment considered, the condition START=HIZ and/or ENABLE="0" is preferably active in each state and brings the asynchronous finite-state machine back to the reset state S1.

Figure 10:
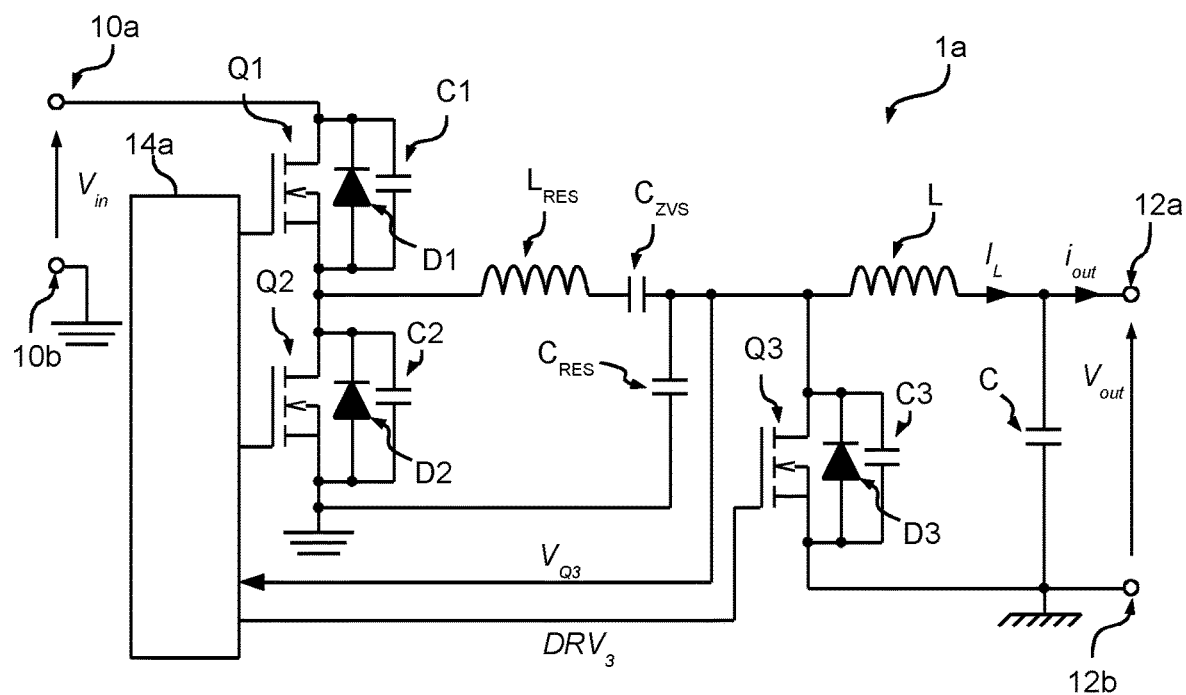
FIG. 10 shows a second embodiment of an electronic converter according to the present disclosure.

In general, the presence of the signal START and of the driver circuit 142 is not binding, in so far as generation of the driving signal $DRV_3$ for the process of switching-on and switching-off of the switch Q3 (i.e., the operation described with reference to the driver circuit 142) may be implemented also directly within the control circuit 14a, for example the control unit 144, which is illustrated in FIG. 10. For instance, the switch Q3 could be driven directly by the control circuit 14a (by an incorporated driver or a driver external to the circuit 14a), where the signal START can be generated also just internally.

At times it is difficult to implement a precise ZCD/ZVD in so far as the information present is little on account of the low ON resistances RDSon of the switch Q3 and/or because the signal measured may be noisy on account of the oscillations due to parasitic inductances of the circuit. In this case, the driver circuit 142 may even move directly from step S1 to step S5 and/or from step S8 to step S5. In this case, the switch Q3 is hence opened immediately (or with a short delay) upon arrival of the signal START, for example at the instant $t_2$. However, this does not represent a problem since the switch Q3 has associated the diode D3, which is closed when the voltage $V_{Q3}$ is negative. Consequently, it is not necessary to detect the instant $t_3$ when the current that traverses the switch Q3 becomes positive since the diode D3 already detects the instant $t_3$. Therefore, it is sufficient to detect via the states S5/S6 only the instant $t_4$ at which the voltage $V_{Q3}$ again reaches zero, and simultaneously close the switch Q3.

In general, the switch Q3 and the associated diode D3 hence represent switching circuit that are driven via the driver circuit 142 in such a way that:
when the driver circuit 142 is deactivated (START="0"), the driver circuit 142 drives the switching circuit Q3/D3 in such a way as to close the switching circuit Q3/D3 by setting the voltage $V_{Q3}$ to zero; and
when the driver circuit 142 is activated (START="1"), the driver circuit 142 drives the switching circuit Q3/D3 in such a way as to:
a) open the switching circuit Q3/D3 when the current that traverses the switching circuit Q3/D3 becomes positive (this condition being detected explicitly via the signal ZCD or implicitly via the diode D3);
b) once the switching circuit Q3/D3 have been opened, close the switching circuit Q3/D3 when the voltage across the switching circuit Q3/D3 reaches zero (this condition being detected via the signal ZVD); and
c) keep the switching circuit Q3/D3 closed until a new activation of the driver circuit 142 is detected (e.g., by detecting that the driver circuit 142 has been deactivated and reactivated).

Figure 11:
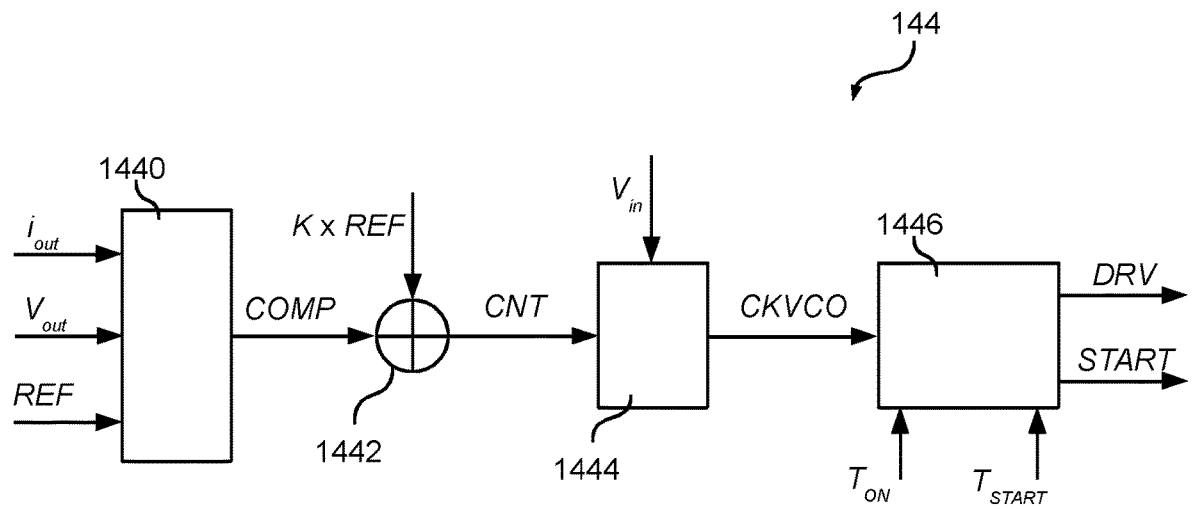
FIGS. 11 and 12 show an embodiment of a control unit for the electronic converter of FIG. 5.

FIG. 11 shows a possible embodiment of the control unit 144 configured for generating the driving signals DRV for the driver circuit 140 and the signal START for the driver circuit 142.

For instance, as described previously, the duration $T_{SW}$ of a switching cycle corresponds to the sum of: the constant time $T_{ON1}$ during which the switch Q1 is closed; the (preferably constant) time $\Delta t2$, until the switch Q2 is closed; the variable time $T_{ON2}$ during which the switch Q2 is closed; and the constant time $\Delta t1$, until the switch Q1 is closed.

In particular, the switch Q1 is hence closed for the duration $T_{ON1}$ and open for the duration $T_{OFF1}=\Delta t2+T_{ON2}+\Delta t1$. Instead, the switch Q2 is closed for the duration $T_{ON2}$ and open for the duration $T_{OFF2}=\Delta t2+T_{ON1}+\Delta t1$.

Consequently, since the other parameters are constant, the control unit 144 can vary the duration $T_{ON2}$ in such a way as to obtain a required output voltage $V_{out}$. In the embodiment considered, the signal DRV supplied to the driver circuit 140 hence indicates at least the duration $T_{ON2}$. In general, the signal DRV supplied to the driver circuit 140 could indicate also the times $T_{ON1}$, $\Delta t1$, and/or $\Delta t2$. For instance, in various embodiments, the signal DRV is a pulsed signal that corresponds to the driving signal DRV$_1$, which hence indicates the times $T_{ON1}$ and $T_{OFF1}$. Consequently, knowing the times $\Delta t1$ and $\Delta t2$, the driver circuit 140 can generate also the driving signal DRV$_2$.

In the embodiment illustrated in FIG. 11, the control unit 144 implicitly determines the time $T_{ON2}$. In particular, in the embodiment considered, the control unit 144 varies the frequency of the signal DRV. However, since the other times are constant (e.g., the time $T_{ON1}$), the frequency directly affects the time $T_{ON2}$; for example, the time $T_{ON2}$ decreases if the frequency increases.

In the embodiment considered, the frequency of the signal DRV is generated by the following blocks: a regulator 1440; an adder 1442; and an oscillator with adjustable frequency 1444.

In particular, the regulator 1440 is configured (in a way in itself known) for comparing the output voltage $V_{out}$ and/or the output current $i_{out}$ with one or more reference values REF. For instance, the output signal COMP of the block 1440 varies until the output voltage $V_{out}$ corresponds to the reference value REF. Consequently, the regulator 1440 may include a circuit for generation of the regulation error and the appropriate compensation network of the system. In an analog embodiment, it may be represented by an error amplifier with compensation, whereas in a digital embodiment it may be represented by an error amplifier, an ADC, and a PID (Proportional-Integral-Derivative) filter.

The presence of an adder node 1442 that generates a signal CNT is optional and may be useful for adding a d.c. value to the signal for the subsequent oscillator 1444, in particular in the case where the reference signal REF can be variable. For instance, by adding a given offset as a function of the reference value REF, for example proportional to the reference value REF (K×REF), a control of a feed-forward type may be implemented.

Finally, the oscillator 1444 generates a signal CKVCO that represents the operating frequency of the system. Also in this case, a regulation of a feed-forward type may be performed, for example as a function of the input voltage $V_{in}$. In particular, the oscillator 1444, which may be digital or analog according to the implementation, will have a gain that varies as the voltage $V_{in}$ varies. In particular, its gain, understood as the output frequency divided by the input frequency, will decrease as the voltage $V_{in}$ increases in an inversely proportional way. This feed-forward regulation may hence be useful for keeping the gain of the system constant as the input voltage $V_{in}$ varies and hence not changing the stability of the loop. However, also this regulation is purely optional and may be omitted, for example in the case where the voltage $V_{in}$ remains constant.

In particular, in the embodiment considered, the time $T_{ON1}$ is constant and the switching frequency $f_{SW}=1/T_{SW}$ of the switches Q1 ($T_{SW}=T_{ON1}+T_{OFF1}$) and Q2 ($T_{SW}=T_{ON2}+T_{OFF2}$) varies. Consequently, in the embodiment considered, the duty cycle DC varies with the following relation:

$$DC = T_{ON} \cdot f_{SW} \tag{6}$$

In addition, the duty cycle may be determined on the basis of the output voltage $V_{out}$ required and the equivalent input voltage $V_{in\_eq}$, which corresponds to the average input voltage used for charging the inductor L, i.e., the average value of the voltage $V_{Q3}$ between the instants $t_3$ and $t_4$:

$$DC = T_{ON1} \cdot f_{SW} = \frac{V_{out}}{V_{in\_eq}} \tag{7}$$

Hence, in the case where the voltage $V_{in\_eq}$ is variable, the oscillator/modulator 1444 should have a modulator gain $G_{MOD}$ inversely proportional to the voltage $V_{in\_eq}$ so as to implement the feed-forward function for the voltage $V_{in}$, and in this way keep the system gain substantially constant.

In particular, in this embodiment, the gain of the modulator will hence depend also upon the control variable COMP:

$$G_{MOD} = \frac{DC}{COMP} = \frac{T_{ON1} \cdot f_{SW}}{COMP} = \frac{G}{V_{in\_eq}} \qquad (8)$$

and since the gain of the oscillator 1442 is defined by $$G_{VCO} = \frac{f_{SW}}{COMP} \qquad (9)$$

Eq. (9) may be combined with Eq. (8), as follows:

$$G_{VCO} = \frac{G}{T_{ON} \cdot V_{IN\_EQ}} \qquad (10)$$

The control variable COMP in steady-state conditions will hence be $$COMP = \frac{V_{OUT}}{G} \qquad (11)$$

Given that very frequently, for reasons of accuracy of the regulation, an integrator is used in the compensation of the control loop (in particular, in the regulator 1440), if it is desired to optimise the response to the reference transition it is useful to keep the value of the signal COMP as constant as possible as the reference REF varies so as not to have to charge or discharge the integrative contribution of the compensation and so as to render the reference transition faster. To do so, it is possible to use the adder 1442 to introduce an offset between the signal COMP and the modulator (the input of which is represented by the oscillator 1444).

In various embodiments, the above offset is equal to the ratio between the regulation-reference value and the gain of the modulator:

$$OFFSET = \frac{V_{OUT}}{G} \qquad (12)$$

Given that in many cases the value of the voltage Vout coincides with the reference value REF or else is an amplification thereof (in the case of division of the feedback from the voltage Vout to the error amplifier), we may write $$OFFSET = \frac{REF}{G} = K \cdot REF$$

Hence, in the embodiment considered, the frequency of the signal CKVCO generated by the oscillator 1444 corresponds to the switching frequency of the half-bridge Q1/Q2. Consequently, the control unit 144 includes a circuit 1446 configured for generating the driving signal DRV and the signal START as a function of the signal CKVCO generated by the oscillator 1444.

Figure 12:
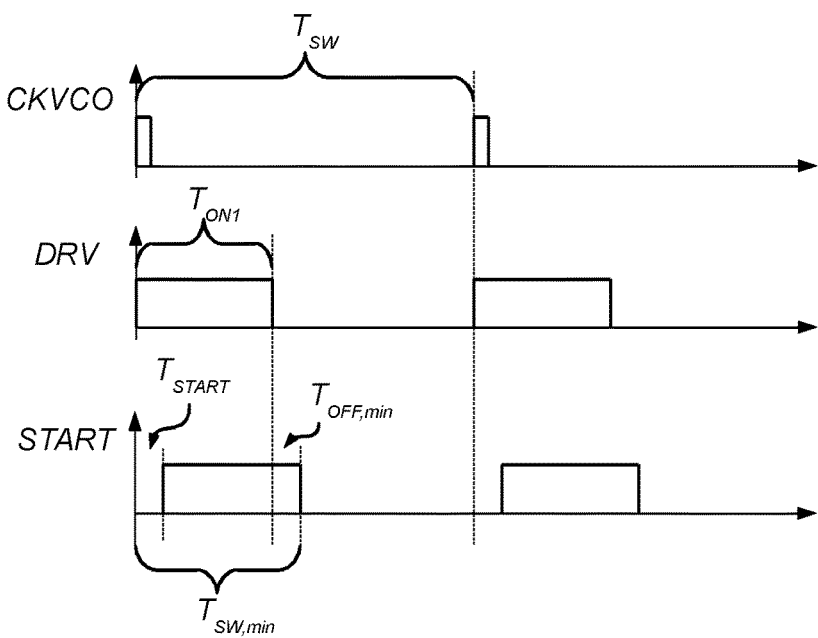

In particular, as illustrated in FIG. 12, in various embodiments, the circuit 1446 sets, at each clock tick of the oscillator 1444 (signal CKVCO), the signal DRV at a high value for a constant duration TON1. Consequently, the signal DRV substantially corresponds to a PWM signal with variable duration TSW, where the ON time is equal to the constant time TON1.

In the embodiment considered, whenever a cycle of the signal CKVCO is generated, the circuit 1446 also generates the signal START. In particular, in various embodiments, the duration of the signal START is equal to the sum of the time TON1 and of a time TOFF_min that represents the minimum ON time of the switch Q2. This time may be useful for limiting the duty cycle of the system (and hence the minimum switching time TSW_min) below 100% and for enabling refresh of the capacitance CZVS at each cycle. Furthermore, considering the operation described with reference to FIG. 9, the next cycle of the signal CKVCO should not arrive before the signal START has returned to "0". There is hence a limitation of maximum frequency of the system.

In various embodiments, the signal START may be delayed with respect to the driving signals DRV by a time TSTART so as to compensate the delay between the driver of the rectifier and the delay of the driver of the half-bridge.

In various embodiments, the control unit 144 may be configured in such a way that the times TOFF_min and/or TSTART can be set.

When the power demand increases, it is possible to increase the number of cells, as is the case for the number of phases in classic multiphase buck converters.

Figure 13:
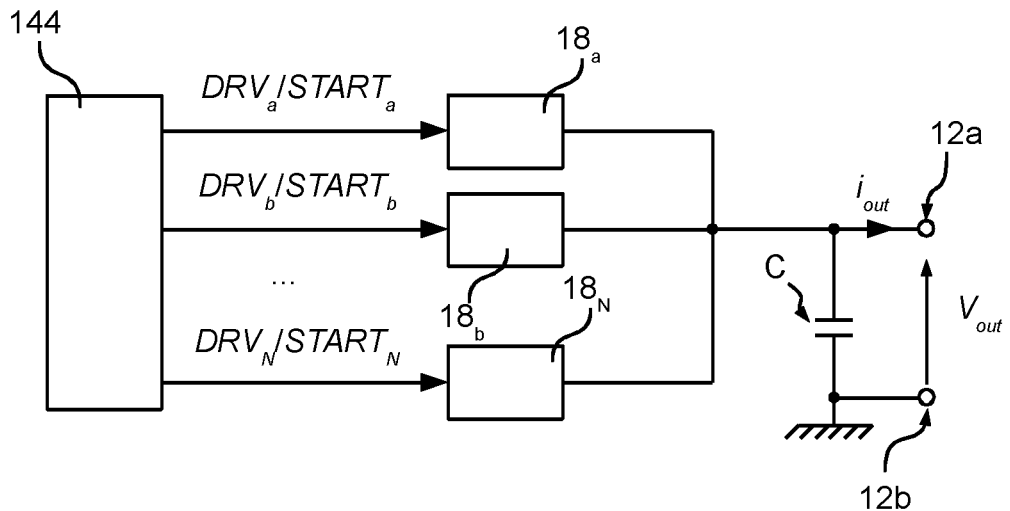
FIG. 13 shows an embodiment of a multi-cell electronic converter according to the present disclosure.

For instance, FIG. 13 shows an embodiment of an electronic converter 1a, which includes a plurality of cells 18a, 18b, . . . ,18N.

In particular, in the embodiment considered, each cell 18a, 18b, . . . ,18N includes a respective half-bridge Q1/Q2, a respective resonant circuit 16 (LRES, CZVS, CRES), a respective inductor L, and a respective switch Q3, as described with reference to FIG. 5. Consequently, in the embodiment considered, the outputs of the cells 18a, 18b, . . . ,18N are connected together to a common terminal 12a (which hence corresponds to the terminal 12a of FIG. 5). In general, each cell 18a, 18b, . . . ,18N may include a respective capacitor C or, as illustrated in FIG. 13, a common capacitor C may be provided connected between the output terminals 12a and 12b, which thus implements the single capacitors of the various cells 18.

In the embodiment considered, the control circuit 14a hence again drives switching of the switches Q1, Q2, and Q3 of each cell 18a, 18b, . . . , 18N. For instance, in the embodiment considered just the control unit 144 is illustrated, which generates for each cell 18a, 18b, . . . , 18N a respective signal DRV and START, and a respective driver circuit 140, as well as a respective driver circuit 142, are integrated in each cell 18a, 18b, . . . , 18N.

Figure 14:
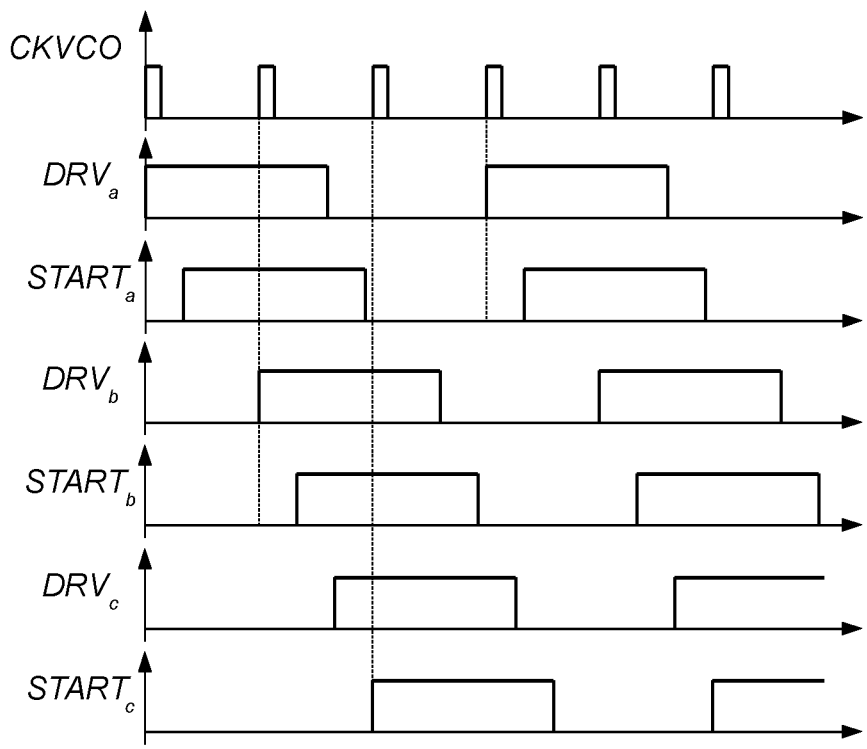
FIGS. 14 to 18 show an embodiment of a control unit for the electronic converter of FIG. 13.

For instance, FIG. 14 shows an example of the various signals DRV and START for three cells 18a, 18b, and 18c, in which each cell is driven via a signal DRV and a respective signal START, where at each cycle of the signal CKVCO the signals DRV and START for the next cell are generated. Consequently, also in this case, the transfer of energy at output may be increased by increasing the frequency of the signal CKVCO.

In general, the control unit 144 can thus implement also in this case the control structure referred to previously.

However, the inventor has noted that to set in parallel N cells it would be expedient to equalize the currents of each cell 18*a*, 18*b*, . . . , 18N in order to prevent problems of reliability of the system. In fact, on account of the possible mismatch between the N cells in parallel, there may arise an unbalancing of the currents between the cells.

Figure 15:
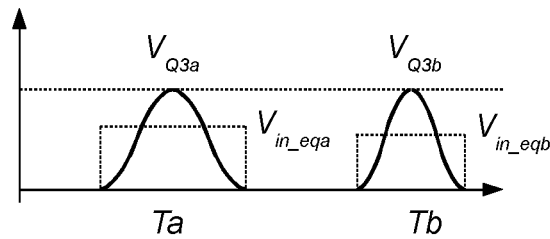

For instance, as illustrated in FIG. 15, if the resonance of the circuit is different between the cells 18*a* and 18*b* it is possible to have a respective duration Ta and Tb of the pulse in the voltage VQ3 (between the instants t3 and t4) but the peak of the voltage VQ3 is the same. In this case, the average value Vin_eq of the cells will be different, and hence by putting them in parallel there will be different currents in the cells.

The cell 18*b* will hence have a lower regulation-voltage value Vin_eq than the cell 18*a* and hence will tend to carry less current.

In buck controllers with constant time TON, the current sharing between the phases is typically managed via variation of time TON of the individual phases according to the current-sharing error. With the converter 1*a* according to the present disclosure, current sharing cannot be managed via the time TON of the individual driving signals DRV since, as described previously, the time TON does not necessarily affect energy transfer. Consequently, another way of compensating the energy difference is required.

However, the instant t3 when the switch Q3 is opened (and hence the amplitude of the current ILRES at the instant t3) for a cell 18 can be modified with the respective signal START that goes from the control unit 144 to the rectifier/driver circuit 142 of the respective cell 18. In particular, as explained previously, the signal START may have a time TSTART for compensating the delays involved. For instance, in various embodiments, the control unit 144 may have programmed a respective default value. By increasing the time TSTART of a cell, it is possible to postpone the instant t3 at which the switch Q3 is opened, thus increasing the amplitude of the pulse in the voltage VQ3.

Consequently, the control unit 144 (which implements current-sharing management in the embodiment considered) can measure the difference between the current of the individual cell and the average current of all the cells. Then, if the error is positive (current in the cell lower than the average), the control unit 14 can increase the time TSTART of the respective cell 18. Instead, if the current error is negative (current in the cell higher than the average), the control unit 14 can reduce the time TSTART of the respective cell 18, for example until a minimum value set by the system is reached.

By so doing, the cell 18 that supplies less current IL to the capacitor C will have the highest energization of the resonance inductance LRES and will thus have a peak value higher than the voltage VQ3, whilst the time of the pulse of the voltage VQ3 will be practically constant and given always by the resonance of the cell.

Figure 16:
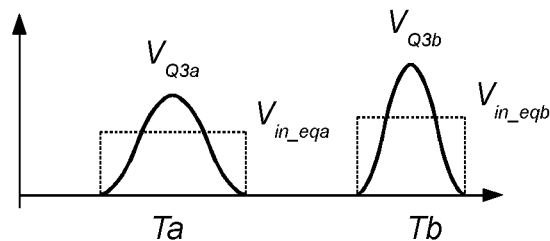

FIG. 16 represents an example of the result of the correction via the current sharing using the time TSTART.

In this way, the equalization of the currents IL supplied by the various cells 18 is implemented not by varying the duration TON1 of the various cells (which are fixed) as occurs in a traditional multiphase buck converter, but by energizing the resonance inductance LRES more than required, thus increasing the peak of the pulse of the voltage VQ3.

Figure 17:
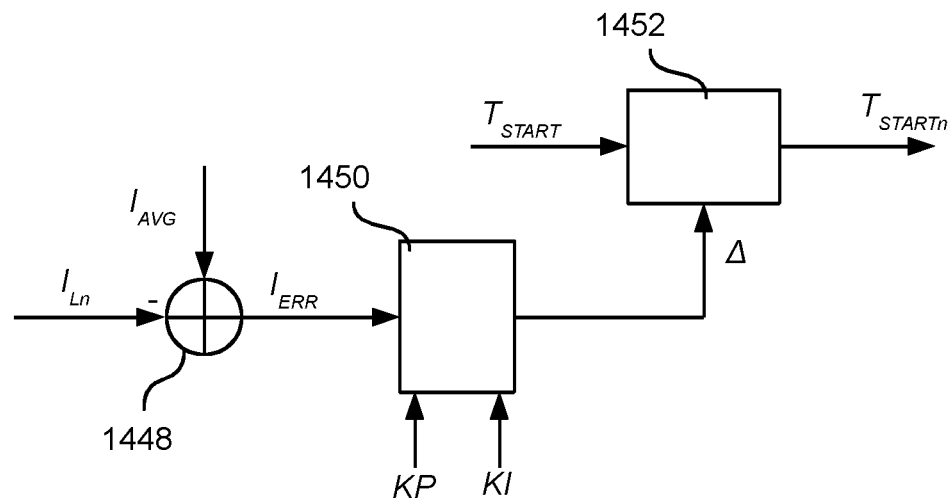

FIG. 17 shows a possible embodiment of a block within the control unit 144 responsible for generation of the signal START of a respective cell 18, in particular of the time TSTART.

In particular, in the embodiment considered, an adder node 1448 calculates the difference between the average of the currents of the cells IAVG and the current ILn of the cell n. The result of this operation IERR is supplied to a PI (proportional-integrative) regulator, which may have two generic filter coefficients KP and KI (higher than or equal to 0) for the P and I components, respectively.

The output of the regulator 1450 hence represents the control variable Δ of current sharing. In particular, in the embodiment considered, this value Δ is added in a block 1452 to the default value TSTART in order to calculate the variable delay TSTARTn that should be applied to the respective signal STARTn of the cell n. The signal STARTn will thus be more delayed than the default signal START (with TSTART) if the average of the currents of the cells IAVG is higher than the current ILn of the cell n.

Figure 18:
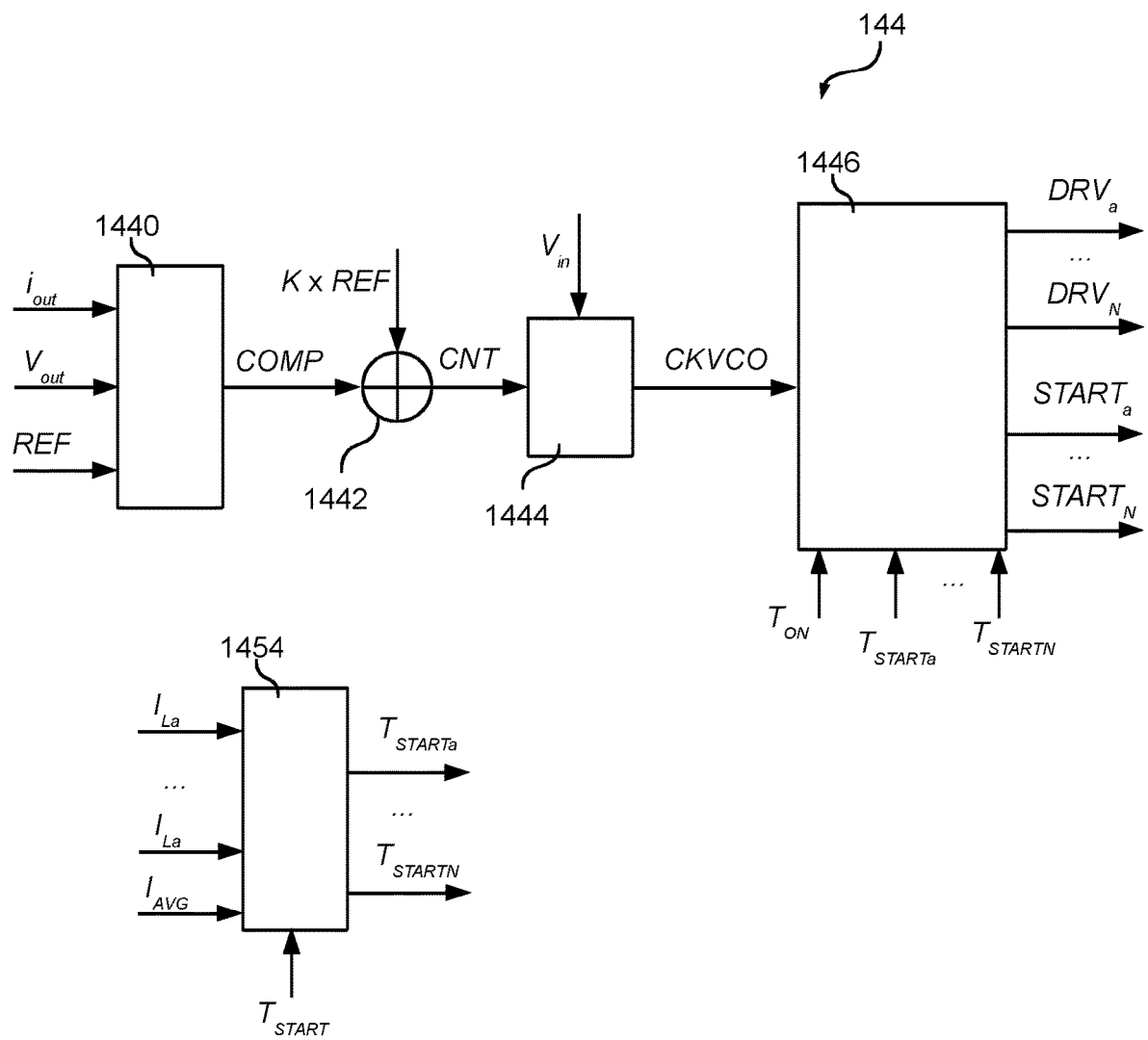

FIG. 18 shows a possible embodiment of the control unit 144 configured for driving a plurality of cells 18.

In particular, as described previously, the control unit 144 includes the blocks 1440, 1442, 1444 for generation of the signal CKVCO.

Furthermore, the control unit 144 includes the block 1446 that generates the signals DRV and START for the cells 18*a*,18*b*, . . . , 18N as a function of the time TON1 and of a respective delay TSTARTa, . . . , TSTARTN.

Finally, the control unit 144 includes a block 1454 that includes, for each cell, the regulation scheme illustrated in FIG. 17; i.e., the block 1454 is configured for generating for each cell a respective delay TSTARTa, . . . , TSTARTN as a function of a minimum value TSTART, of the average of the currents of the cells IAVG, and of the current ILn of the respective cell 18*a*,18*b*, . . . , 18N. Consequently, the delays TSTARTa, . . . , TSTARTN can be supplied to the block 1446, which applies the delays TSTARTa, . . . , TSTARTN to the various signals STARTa, . . . , STARTN.

Of course, without prejudice to the principle of the invention, the details of construction and the embodiments may vary widely with respect to what has been described and illustrated herein purely by way of example, without thereby departing from the scope of the present invention.

What is claimed is:

1. An electronic converter comprising:
    a first input terminal and a second input terminal for receiving an input voltage;
    a first output terminal and a second output terminal for supplying an output voltage or an output current;
    a switching cell configured for supplying a current, the switching cell comprising
        a half-bridge circuit comprising a first electronic switch and a second electronic switch connected in series between the first input terminal and the second input terminal, the half-bridge circuit comprising an intermediate point between the first electronic switch and the second electronic switch,
        a first inductor comprising a first terminal and a second terminal that is directly connected to the first output terminal,
        a second inductor connected to the intermediate point,
        a first capacitor connected in series with the first inductor and the second inductor,
        a second capacitor connected between the intermediate point and the second input terminal, and
        a switching circuit connected between the first terminal of the first inductor and the second output terminal;
    a first circuit path configured to couple the second inductor with the first output terminal through the first capacitor and the first inductor; and a second circuit path configured to couple the second capacitor with the first output terminal through the first inductor.

2. The electronic converter according to claim 1, wherein a third capacitor is connected in parallel to the first electronic switch and a fourth capacitor is connected in parallel to the second electronic switch, wherein a conduction terminal of the second electronic switch is directly coupled to the second input terminal.

3. The electronic converter according to claim 1, further comprising:
a control circuit configured for driving the first electronic switch and the second electronic switch as a function of the output voltage and/or the output current, wherein the control circuit comprises a driver circuit configured for driving the switching circuit, wherein driving the switching circuit comprises:
when the driver circuit is deactivated, closing the switching circuit; and
when the driver circuit is activated, opening the switching circuit when a voltage at the first terminal of the first inductor is greater than a voltage at the second output terminal, closing the switching circuit when a voltage across the switching circuit reaches zero, and keeping the switching circuit closed until a new activation of the driver circuit is detected.

4. The electronic converter according to claim 3, wherein the control circuit is configured to drive the first electronic switch and the second electronic switch, wherein driving the first electronic switch and the second electronic switch comprises repeating periodically with a switching period:
closing the first electronic switch and opening the second electronic switch during a first interval;
opening the first electronic switch and opening the second electronic switch during a second interval subsequent to the first interval;
opening the first electronic switch and closing the second electronic switch during a third interval subsequent to the second interval; and
opening the first electronic switch and opening the second electronic switch during a fourth interval subsequent to the third interval.

5. The electronic converter according to claim 4, wherein a duration of the first interval is constant and longer than a resonance period of a resonant circuit formed by the first inductor, the second inductor, and the second capacitor, and wherein the control circuit is configured for varying a duration of the switching period as a function of the output voltage and/or the output current.

6. The electronic converter according to claim 4, wherein a duration of the fourth interval is constant and corresponds to a quarter of a resonance period of a resonant circuit formed by the second inductor, the first capacitor, and the second capacitor, and wherein a duration of the second interval is constant.

7. The electronic converter according to claim 4, wherein the control circuit is configured to activate the driver circuit with a first delay with respect to a start of the first interval, and/or deactivate the driver circuit with a second delay with respect to an end of the first interval.

8. The electronic converter according to claim 7, further comprising a plurality of switching cells, wherein the control circuit is configured to vary a duration of the first delay of at least one switching cell as a function of a current supplied by the first inductor of the at least one switching cell with respect to an average current supplied by the first inductors of the plurality of switching cells.

9. The electronic converter according to claim 1, wherein the switching circuit comprises a third electronic switch connected between the first terminal of the first inductor and the second output terminal.

10. The electronic converter according to claim 9, wherein the first electronic switch, the second electronic switch, and the third electronic switch are field-effect transistors, wherein each of the first electronic switch, the second electronic switch, and the third electronic switch comprises a respective parasitic output capacitance and a respective body diode.

11. A method for controlling an electronic converter, the method comprising:
a) closing a first electronic switch of a half-bridge circuit of an electronic converter during a first interval, the half-bridge circuit comprising the first electronic switch and a second electronic switch connected in series between a first input terminal of the electronic converter and a second input terminal of the electronic converter, wherein the electronic converter further comprises a switching circuit connected between a first inductor and a first output terminal of the electronic converter;
b) opening the first electronic switch after the first interval;
c) closing the second electronic switch after a second interval subsequent to the first interval;
d) opening the second electronic switch after a third interval subsequent to the second interval; and
e) returning to step a) after a fourth interval subsequent to the third interval, wherein between steps a) and b), the method further comprises:
opening the switching circuit when a voltage at the first inductor is greater than a voltage at a second output terminal; and
once the switching circuit has been opened, closing the switching circuit when a voltage across the switching circuit reaches zero.

12. The method according to claim 11, further comprising keeping the switching circuit closed until a new activation of a driver circuit is detected.

13. The method according to claim 11, further comprising:
opening the second electronic switch during the first interval;
opening the first electronic switch and opening the second electronic switch during the second interval;
opening the first electronic switch and closing the second electronic switch during the third interval; and
opening the first electronic switch and opening the second electronic switch during the fourth interval.

14. The method according to claim 11, wherein a duration of the first interval is constant and longer than a resonance period of a resonant circuit comprising a second inductor comprising a first terminal connected at an intermediate point between the first electronic switch and the second electronic switch, and a second terminal connected to the first output terminal of the electronic converter.

15. The method according to claim 14, wherein a duration of the fourth interval is constant and corresponds to a quarter of the resonance period of the resonant circuit formed by a first capacitor, a second capacitor, and a second inductor connected in series between the first terminal of the first inductor and the intermediate point between the first electronic switch and the second electronic switch.

16. The method according to claim 15, wherein a duration of the second interval is constant.

17. An electronic converter comprising:
a first input terminal and a second input terminal for receiving an input voltage;
a first output terminal and a second output terminal for supplying an output voltage or an output current; and
a switching cell configured for supplying a current, the switching cell comprising
a half-bridge circuit comprising a first electronic switch and a second electronic switch connected in series between the first input terminal and the second input terminal, the half-bridge circuit comprising an intermediate point between the first electronic switch and the second electronic switch,
a first inductor and a second inductor connected in series between the intermediate point and the first output terminal, the first inductor comprising a first terminal and a second terminal that is directly connected to the first output terminal,
a first capacitor connected in series between the first inductor and the second inductor,
a second capacitor connected in parallel with the second electronic switch between the intermediate point and the second input terminal,
a third capacitor connected between the first output terminal and the second output terminal, and
a switching circuit connected between the first terminal of the first inductor and the second output terminal;
wherein a capacitance of the third capacitor is greater than a capacitance of the second capacitor; and
wherein a capacitance of the first capacitor is between the capacitance of the second capacitor and the capacitance of the third capacitor.

18. The electronic converter according to claim 17, further comprising:
a control circuit configured for driving the first electronic switch and the second electronic switch as a function of the output voltage and/or the output current, wherein the control circuit comprises a driver circuit configured for driving the switching circuit, wherein driving the switching circuit comprises:
when the driver circuit is deactivated, closing the switching circuit; and
when the driver circuit is activated, opening the switching circuit when a voltage at the first terminal of the first inductor is greater than a voltage at the second output terminal, closing the switching circuit when a voltage across the switching circuit reaches zero, and keeping the switching circuit closed until a new activation of the driver circuit is detected.

19. The electronic converter according to claim 18, wherein the control circuit is configured to drive the first electronic switch and the second electronic switch, wherein driving the first electronic switch and the second electronic switch comprises repeating periodically with a switching period:
closing the first electronic switch and opening the second electronic switch during a first interval;
opening the first electronic switch and opening the second electronic switch during a second interval subsequent to the first interval;
opening the first electronic switch and closing the second electronic switch during a third interval subsequent to the second interval; and
opening the first electronic switch and opening the second electronic switch during a fourth interval subsequent to the third interval.

20. The electronic converter according to claim 19, wherein a duration of the first interval is constant and longer than a resonance period of a resonant circuit formed by the first inductor, the second inductor, and the second capacitor, and wherein the control circuit is configured for varying a duration of the switching period as a function of the output voltage and/or the output current.

* * * * *